US009886537B2

(12) United States Patent
Nomura

(10) Patent No.: US 9,886,537 B2
(45) Date of Patent: Feb. 6, 2018

(54) METHOD OF SUPPORTING DESIGN, COMPUTER PRODUCT, AND SEMICONDUCTOR INTEGRATED CIRCUIT

(71) Applicant: Socionext Inc., Yokohama-shi, Kanagawa (JP)

(72) Inventor: Kenichi Nomura, Akishima (JP)

(73) Assignee: SOCIONEXT INC., Yokohama (JP)

( * ) Notice: Subject to any disclaimer, the term of this patent is extended or adjusted under 35 U.S.C. 154(b) by 38 days.

(21) Appl. No.: 15/096,774

(22) Filed: Apr. 12, 2016

(65) Prior Publication Data

US 2016/0224712 A1 Aug. 4, 2016

Related U.S. Application Data

(63) Continuation of application No. PCT/JP2014/059592, filed on Mar. 31, 2014.

(51) Int. Cl.
*G06F 17/50* (2006.01)

(52) U.S. Cl.
CPC ...... *G06F 17/5045* (2013.01); *G06F 17/5081* (2013.01); *G06F 2217/78* (2013.01)

(58) Field of Classification Search
CPC ........ G06F 17/50
USPC ........ 716/136
See application file for complete search history.

(56) References Cited

U.S. PATENT DOCUMENTS

2004/0135560 A1* 7/2004 Kernahan ............. H02M 3/157 323/282
2006/0239102 A1 10/2006 Saita et al.

FOREIGN PATENT DOCUMENTS

JP 63-96939 4/1988
JP 5-206276 8/1993
JP 2000-58653 2/2000
JP 2011-9291 1/2011
JP 2011-29333 2/2011
WO WO 2004/077556 A1 9/2004

OTHER PUBLICATIONS

Japanese Platform for Patent Information, Publication No. 2000-58653, published Feb. 25, 2000.
Japanese Platform for Patent Information, Publication No. 5-206276, published Aug. 13, 1993.
(Continued)

*Primary Examiner* — Thuan Do
(74) *Attorney, Agent, or Firm* — Staas & Halsey LLP

(57) ABSTRACT

A storage device stores first information indicating a first consumption current value during operation of a first partial circuit included in a circuit under design and second information indicating a surplus current value based on an allowable current value of a power source terminal of a second partial circuit and a second consumption current value during operation of the second partial circuit. A design support apparatus compares the surplus current value and the first consumption current value. When determining that the surplus current value is the first consumption current value or greater, the design support apparatus controls a layout apparatus to generate circuit information for a circuit under design where a power-supplying terminal of the second partial circuit and a power source terminal of the first partial circuit are connected.

14 Claims, 22 Drawing Sheets

(56) References Cited

OTHER PUBLICATIONS

Japanese Platform for Patent Information, Publication No. 63-96939, published Apr. 27, 1988.
Espacenet Bibliographic data, Publication No. WO 2004/077556 A1, published Sep. 10, 2004.
Japanese Platform for Patent Information, Publication No. 2011-9291, published Jan. 13, 2011.
Japanese Platform for Patent Information, Publication No. 2011-29333, published Feb. 10, 2011.
International Search Report dated Jun. 10, 2014, in corresponding International Application No. PCT/JP2014/059592.
International Preliminary Report on Patentability dated Jun. 10, 2014 in corresponding International Application No. PCT/JP2014/059592.

* cited by examiner

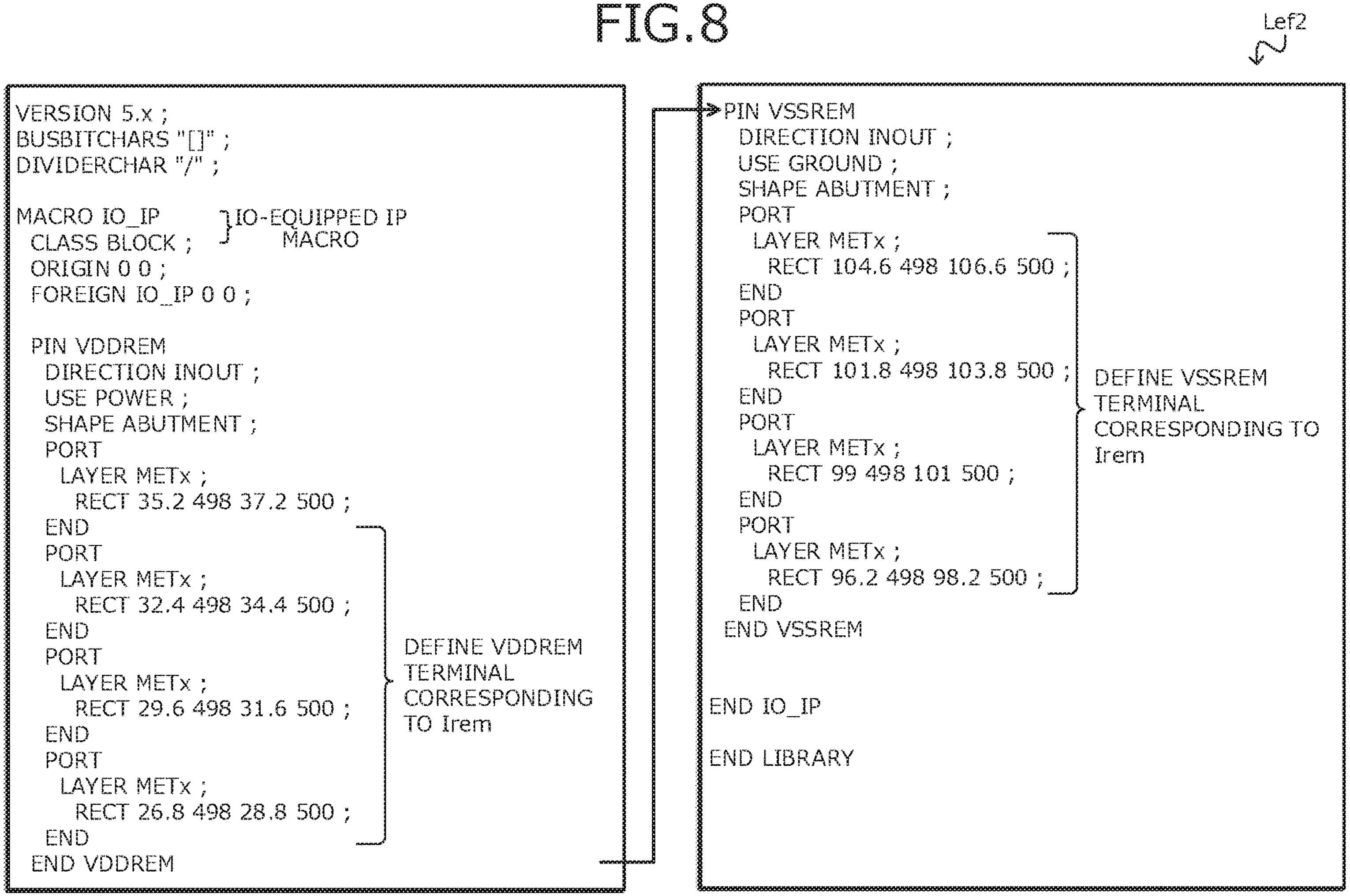

FIG.8

```
VERSION 5.x ;
BUSBITCHARS "[]" ;
DIVIDERCHAR "/" ;

MACRO IO_IP      } IO-EQUIPPED IP
   CLASS BLOCK ;        MACRO
   ORIGIN 0 0 ;
   FOREIGN IO_IP 0 0 ;

   PIN VDDREM
      DIRECTION INOUT ;
      USE POWER ;
      SHAPE ABUTMENT ;
      PORT
         LAYER METx ;
            RECT 35.2 498 37.2 500 ;
      END
      PORT
         LAYER METx ;
            RECT 32.4 498 34.4 500 ;   } DEFINE VDDREM
      END                                 TERMINAL
      PORT                                CORRESPONDING
         LAYER METx ;                     TO Irem
            RECT 29.6 498 31.6 500 ;
      END
      PORT
         LAYER METx ;
            RECT 26.8 498 28.8 500 ;
      END
   END VDDREM
```

```
→PIN VSSREM                              ⤴ Lef2
      DIRECTION INOUT ;
      USE GROUND ;
      SHAPE ABUTMENT ;
      PORT
         LAYER METx ;
            RECT 104.6 498 106.5 500 ;
      END
      PORT
         LAYER METx ;
            RECT 101.8 498 103.8 500 ;
      END                                  } DEFINE VSSREM
      PORT                                    TERMINAL
         LAYER METx ;                         CORRESPONDING TO
            RECT 99 498 101 500 ;             Irem
      END
      PORT
         LAYER METx ;
            RECT 96.2 498 98.2 500 ;
      END
   END VSSREM
END IO_IP
END LIBRARY
```

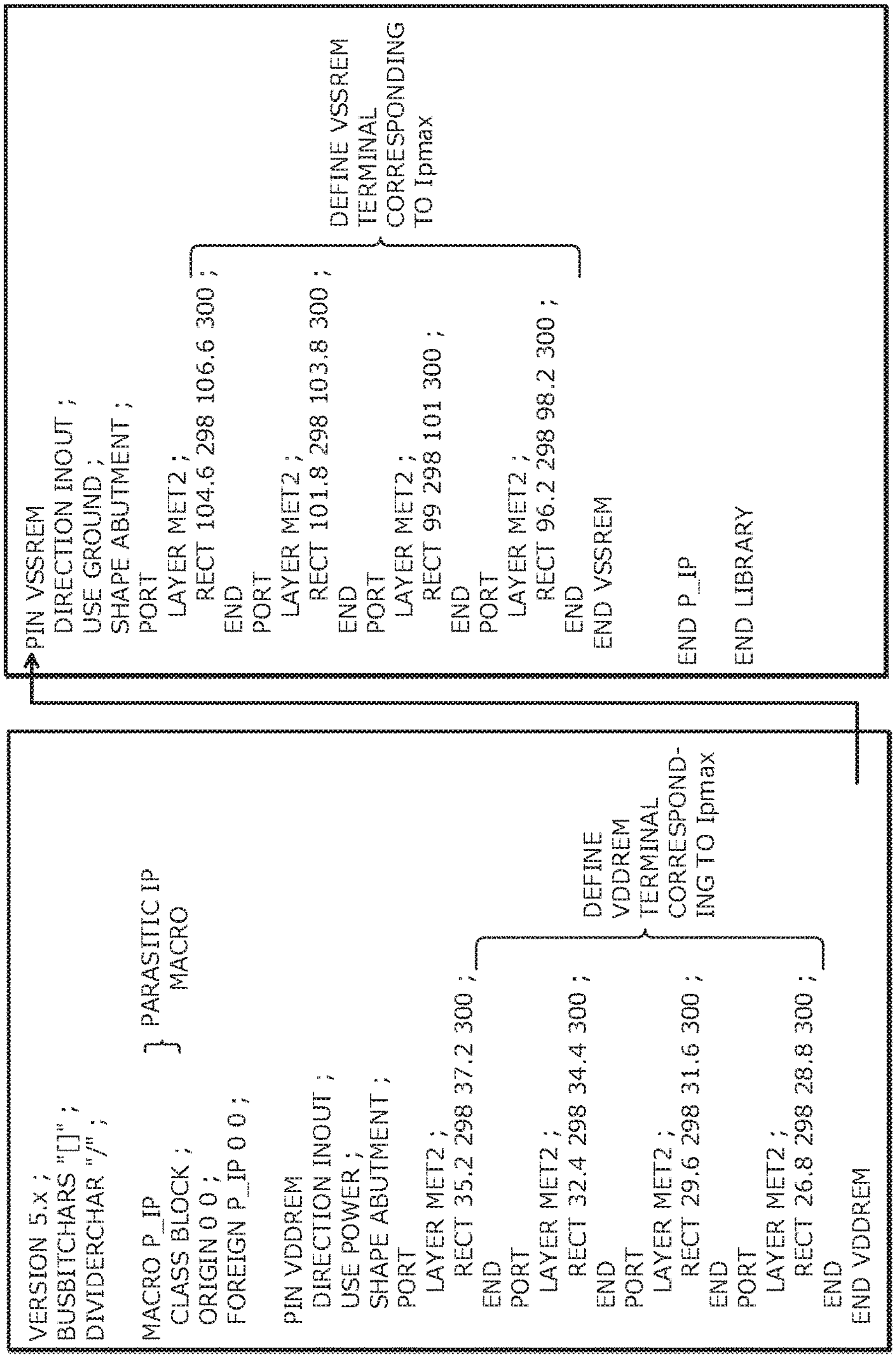

FIG. 9

```
VERSION 5.x ;
BUSBITCHARS "[]" ;
DIVIDERCHAR "/" ;

MACRO P_IP              ⎫ PARASITIC IP
  CLASS BLOCK ;         ⎬   MACRO
  ORIGIN 0 0 ;          ⎭
  FOREIGN P_IP 0 0 ;

  PIN VDDREM
    DIRECTION INOUT ;
    USE POWER ;
    SHAPE ABUTMENT ;
    PORT
      LAYER MET2 ;
        RECT 35.2 298 37.2 300 ;   ⎫
    END                             ⎪
    PORT                            ⎪
      LAYER MET2 ;                  ⎪  DEFINE
        RECT 32.4 298 34.4 300 ;   ⎬  VDDREM
    END                             ⎪  TERMINAL
    PORT                            ⎪  CORRESPOND-
      LAYER MET2 ;                  ⎪  ING TO Ipmax
        RECT 29.6 298 31.6 300 ;    ⎪
    END                             ⎪
    PORT                            ⎪
      LAYER MET2 ;                  ⎪
        RECT 26.8 298 28.8 300 ;   ⎭
    END
  END VDDREM
```

```
                                                    Lef1
  PIN VSSREM
    DIRECTION INOUT ;
    USE GROUND ;
    SHAPE ABUTMENT ;
    PORT
      LAYER MET2 ;
        RECT 104.6 298 106.6 300 ;   ⎫
    END                                ⎪
    PORT                               ⎪
      LAYER MET2 ;                     ⎪  DEFINE VSSREM
        RECT 101.8 298 103.8 300 ;    ⎬  TERMINAL
    END                                ⎪  CORRESPONDING
    PORT                               ⎪  TO Ipmax
      LAYER MET2 ;                     ⎪
        RECT 99 298 101 300 ;          ⎪
    END                                ⎪
    PORT                               ⎪
      LAYER MET2 ;                     ⎪
        RECT 96.2 298 98.2 300 ;      ⎭
    END
  END VSSREM

END P_IP

END LIBRARY
```

FIG.10

```
################################################
# Define power/ground nets by createGlobalNet
################################################

createGlobalNet  VDDREM_IP      -typ 1.x -min 1.x -max 1.x -power  -pif #PW1
createGlobalNet  VSSREM_IP      -typ 0   -min 0   -max 0   -ground -pif #GND

connectToGlobalNet -to_global_net VDDREM_IP  -pins VDDREM -in_instances IO_IP  ⎫ POWER SOURCE TERMINAL
connectToGlobalNet -to_global_net VSSREM_IP  -pins VSSREM -in_instances IO_IP  ⎭ CONNECTION INFORMATION
                                                                                 OF IO-EQUIPPED IP MACRO
connectToGlobalNet -to_global_net VDDREM_IP  -pins VDDREM -in_instances P_IP   ⎫ POWER SOURCE TERMINAL
connectToGlobalNet -to_global_net VSSREM_IP  -pins VSSREM -in_instances P_IP   ⎭ CONNECTION INFORMATION
                                                                                 OF PARASITIC IP MACRO
```

CLib

FIG.11

Lib2

```
technology:"xxxx";
*/
library(xxx_IOIP_t_pxxx_x.xv) {
delay_model          : table_lookup ;
define ("add_pg_pin_to_lib", "library", "boolean");
add_pg_pin_to_lib : true;

voltage_map ( VDDREM, x.x00000 );
voltage_map ( VSSREM, 0.000000 );
time_unit            : "1xs" ;
voltage_unit         : "1xV" ;
current_unit         : "1xA" ;
pulling_resistance_unit     : "1xohm" ;
capacitive_load_unit(1,pf);
leakage_power_unit          : "1xW" ;

cell(IO_IP){
  pg_pin (VDDREM) {
    pg_type : primary_power;
    internal power : 8mA
    voltage_name : VDDREM;
  }
  pg_pin (VSSREM) {
    pg_type : primary_ground;
    voltage_name : VSSREM;
  }
}

}
```

IO-EQUIPPED IP MACRO

DEFINE VDDREM TERMINAL
CORRESPONDING TO CURRENT VALUE Irem

FIG. 12

Lib1

```
technology:"xxxx";
*/
library(xxx_P_IP_t_pxxx_x.xv) {
delay_model                  : table_lookup ;
define ("add_pg_pin_to_lib",  "library",  "boolean");
add_pg_pin_to_lib : true;

voltage_map ( VDDREM, x.x00000 );
voltage_map ( VSSREM, 0.000000 );
time_unit                   : "1xs" ;
voltage_unit                : "1xV" ;
current_unit                : "1xA" ;
pulling_resistance_unit     : "1xohm" ;
capacitive_load_unit(1,pf);
leakage_power_unit          : "1xW" ;


cell(P_IP){                          } PARASITIC IP MACRO
  pg_pin (VDDREM) {
    pg_type : primary_power;           DEFINE VDDREM TERMINAL
  internal power : 5mA                 CORRESPONDING TO CURRENT VALUE
    voltage_name : VDDREM;             Ipmax
  }
  pg_pin (VSSREM) {
    pg_type : primary_ground;
    voltage_name : VSSREM;
  }
}


}
```

METHOD OF SUPPORTING DESIGN, COMPUTER PRODUCT, AND SEMICONDUCTOR INTEGRATED CIRCUIT

CROSS REFERENCE TO RELATED APPLICATIONS

This application is a continuation application of International Application PCT/JP2014/059592, filed on Mar. 31, 2014, and designating the U.S., the entire contents of which are incorporated herein by reference.

FIELD

The embodiments discussed herein are related to a method of supporting design, a computer product, and a semiconductor integrated circuit.

BACKGROUND

In layout design of a semiconductor integrated circuit, a value of current flowing through power source wiring is calculated to determine a power source wiring width, and the determined power source wiring width is used for wiring a signal line of a functional block in a conventionally known technique (see, e.g., Japanese Laid-Open Patent Publication No. 2000-58653).

In layout design of a semiconductor integrated circuit, a value of current flowing through terminals of cells and a required line width of each of the terminals are calculated to determine a required line width of wiring, and the determined required line width of wiring is used for wiring in a conventionally known technique (see, e.g., Japanese Laid-Open Patent Publication No. H5-206276).

In layout design of a semiconductor integrated circuit, a constant proportional to a length of a cell array is defined for each block such that a decrease in the power source of the block does not exceed a standard value, whereby a line width of power source wiring is determined according to the constant in a conventionally known technique (see, e.g., Japanese Laid-Open Patent Publication No. S63-96939).

Nonetheless, to supply a power to an analog circuit, for example, an input/output circuit of the power source is disposed dedicated for the analog circuit and therefore, a problem arises in that the input/output circuits increase according to the number of the analog circuits.

SUMMARY

According to an aspect of an embodiment, a method of supporting design includes comparing, by a computer, a first consumption current value indicated by first information stored in a storage device and a surplus current value indicated by second information stored in the storage device, the computer having the storage device storing the first information and the second information, the first information indicating the first consumption current value during operation of a first partial circuit included in a circuit under design, the second information indicating the surplus current value based on an allowable current value of a power source terminal of a second partial circuit and a second consumption current value during operation of the second partial circuit, the power source terminal being included in the circuit, different from the first partial circuit, and supplied by a same power source as the first partial circuit; and controlling, by the computer and according to a result of comparing the first consumption current value and the surplus current value, a layout apparatus to generate circuit information for a circuit in the circuit under design, where a power-supplying terminal of the second partial circuit capable of supplying to another circuit, power supplied to the power source terminal of the second partial circuit is connected to a power source terminal of the first partial circuit to which the power is supplied.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory view of an example of an IO-equipped IP library Lef2;

FIG. 9 is an explanatory view of an example of a parasitic IP library Lef1;

FIG. 10 is an explanatory view of an example of a library CLib;

FIG. 11 is an explanatory view of an example of an IO-equipped IP library Lib2;

FIG. 12 is an explanatory view of an example of a parasitic IP library Lib1;

DESCRIPTION OF EMBODIMENTS

Embodiments of a method of supporting design, a design support program, and a semiconductor integrated circuit will be described in detail with reference to the accompanying drawings.

Figure 1:
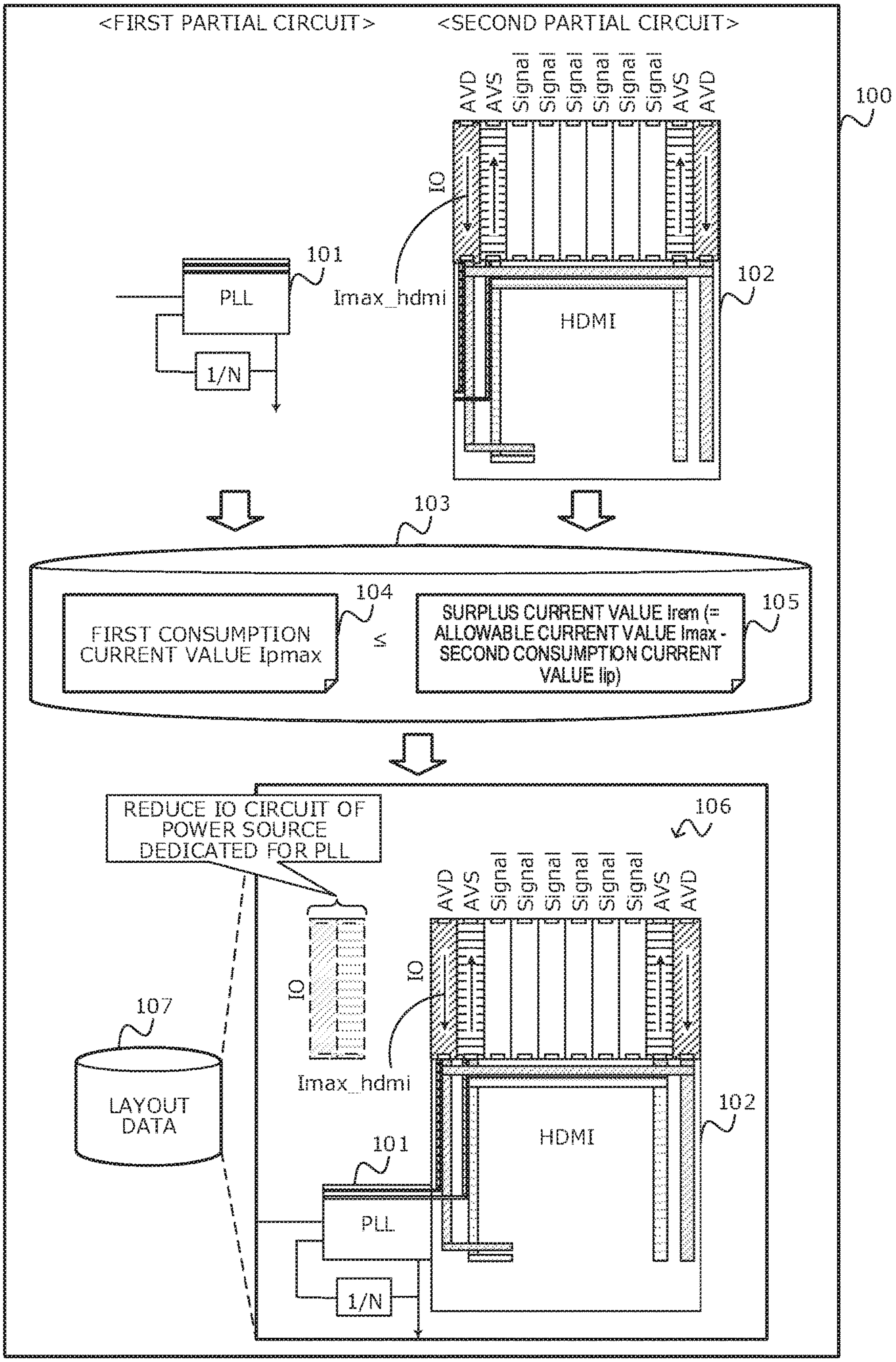
FIG. 1 is an explanatory view of an example of a method of supporting design according to the present invention.

FIG. 1 is an explanatory view of an example of a method of supporting design according to the present invention. A design support apparatus 100 is a computer that supports the design of a layout of a semiconductor integrated circuit. The method of supporting design, for example, is an execution of processes by the design support apparatus 100. A circuit under design has a first partial circuit 101 and a second partial circuit 102. The first partial circuit 101 and the second partial circuit 102 are analog intellectual property (IP) macros, for example. In the example depicted in FIG. 1, the first partial circuit 101 is a phase locked loop (PLL) and the second partial circuit 102 is a high-definition multimedia interface ((HDMI) registered trademark).

Conventionally, for example, an analog circuit such as a PLL has a dedicated power source to suppress deterioration in jitter consequent to power source noise of a core circuit portion included in the circuit under design. Therefore, the PLL has an input/output circuit of the power source dedicated for the PLL. Recently, for example, in some cases, a semiconductor integrated circuit is disposed with multiple PLLs to construct multiple clock systems and it is a problem that the number of the input/output circuits of the power source dedicated for the PLLs increases. The increase in the number of the input/output circuits causes a problem of an increase in area resulting from the input/output circuits. If the number of external input/output terminals is limited due to restriction at the time of packaging of the semiconductor integrated circuit etc., the increased number of the input/output circuits may exceed a limit on the number of the external input/output terminals.

Therefore, if a surplus current value Irem of a power source of the second partial circuit 102 is equal to or greater than a maximum consumption current value during operation of the first partial circuit 101, the design support apparatus 100 provides support for connecting a power-supplied terminal of the first partial circuit 101 to a power-supplying terminal of the second partial circuit 102. The power-supplied terminal is a terminal to be supplied with power. In the following examples, the power-supplied terminal is referred to as a power source terminal. The power-supplying terminal is a terminal capable of supplying power to another circuit. This enables reduction in the number of input/output circuits of the power source of the first partial circuit 101. A reduction in the number of the input/output circuits can suppress an increase in area resulting from the input/output circuits. Additionally, the number of external input/output terminals used can be cut down. An input/output circuit is herein referred to as an IO (input output) circuit.

First, the design support apparatus 100 has a storage unit 103. The storage unit 103 stores, for example, first information 104 indicating a first consumption current value Ipmax during operation of the first partial circuit 101 included in the circuit under design. The first consumption current value Ipmax is, for example, a maximum consumption current value during operation of the first partial circuit 101. The maximum consumption current value during operation of the first partial circuit 101 may be, for example, a value defined in design specifications, a value determined according to an empirical value etc., or a value determined based on a target value, etc. The maximum consumption current value during operation of the first partial circuit 101 may be, for example, a value estimated from the operation frequency of the first partial circuit 101, the type and number of cells in the first partial circuit 101, etc.

The storage unit 103 stores second information 105 indicating a surplus current value Irem. The surplus current value Irem is a value based on an allowable current value Imax of a power source terminal that is included in the different second partial circuit 102 and that is supplied by the same power source as the first partial circuit 101, and a second consumption current value Iip during operation of the second partial circuit 102. The second consumption current value Iip is, for example, a maximum consumption current value during operation of the second partial circuit 102. The maximum consumption current value during operation of the second partial circuit 102 may be, for example, a value defined in design specifications or a value determined according to an empirical value, etc. The maximum consumption current value during operation of the second partial circuit 102 may be, for example, a value estimated from the operation frequency of the second partial circuit 102, the type and number of cells in the second partial circuit 102, etc. The allowable current value Imax is, for example, an amount of current that can flow through metal wiring forming the power source terminal of the second partial circuit 102, and is a value defined according to a semiconductor process technique for producing the circuit under design. The surplus current value Irem is, for example, a value of a power source current that can be applied to a circuit other than the second partial circuit 102 and is a value obtained by subtracting the second consumption current value Iip from the allowable current value Imax.

The design support apparatus 100 compares the first consumption current value Ipmax indicated by the first information 104 stored in the storage unit 103 with the surplus current value Irem indicated by the second information 105 stored in the storage unit 103. As a process of the comparison, for example, the design support apparatus 100 determines whether the surplus current value Irem is greater than the first consumption current value Ipmax by a predetermined value or more. For example, the predetermined value is a value equal to or greater than zero and is a value defined in advance by a user of the design support apparatus 100 etc. In the example depicted in FIG. 1, the predetermined value is zero and therefore, the design support apparatus 100 determines whether the surplus current value Irem is equal to or greater than the first consumption current value Ipmax.

According to the result of comparison between the first consumption current value Ipmax and the surplus current value Irem, the design support apparatus 100 controls a layout apparatus to generate circuit information of a circuit 106 in the object circuit. The circuit 106 is a circuit connecting the power-supplying terminal of the second partial circuit 102 and the power source terminal of the first partial circuit 101. The first partial circuit 101 and the second partial circuit 102 are adjacently arranged as depicted in the circuit 106 such that the power-supplying terminal of the second partial circuit 102 is connected to the power source terminal of the first partial circuit 101. In the example of FIG. 1, the circuit information is layout data 107. The layout data 107 is physical data and has information that indicates the position of the first partial circuit 101 and the position of the second partial circuit 102, for example. The power-supplying terminal of the second partial circuit 102 is a terminal capable of supplying to another circuit, the power supplied to the power source terminal of the second partial circuit 102, and is made up of metal wiring, etc. The power source terminal of the first partial circuit 101 is a terminal for supplying power to the first partial circuit 101 and is made up of a metal wiring, etc. Although the design support apparatus 100 has the layout apparatus in the example depicted in FIG. 1, the layout apparatus may be an apparatus separate from the design support apparatus 100. In the example depicted in FIG. 1, the design support apparatus 100 generates the circuit information when the surplus current value Irem is equal to or greater than the first consumption current value Ipmax. On the other hand, when the surplus current value Irem is not equal to or greater than the first consumption current value Ipmax, the design support apparatus 100 does not generate the circuit information and outputs information indicating that the power-supplying terminal of the second partial circuit 102 is not connected to the power source terminal of the first partial circuit 101. For example, the design support apparatus 100 may output an error message to a display, etc., or may store information of the error message into the storage unit 103.

As described above, when the maximum operation consumption current value of the first partial circuit 101 such as a PLL is equal to or less than the surplus current value of the power source of the second partial circuit 102, the design support apparatus 100 performs design such that the power source terminal of the first partial circuit 101 is connected to the power-supplying terminal of the second partial circuit 102. As a result, the number of the IO circuits can be reduced. Before describing the design support apparatus 100 in detail, an example of a PLL having dedicated IO circuits for analog power sources as in the conventional case will briefly be described with reference to FIGS. 2A and 2B.

Figure 2B:
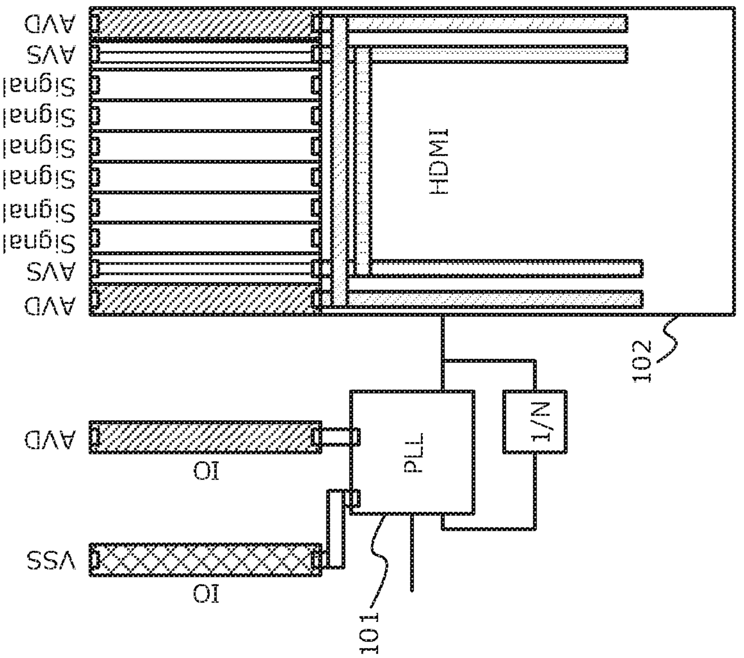
FIGS. 2A and 2B are explanatory views of an example of a PLL having dedicated IO circuits for analog power sources.
Figure 2A:
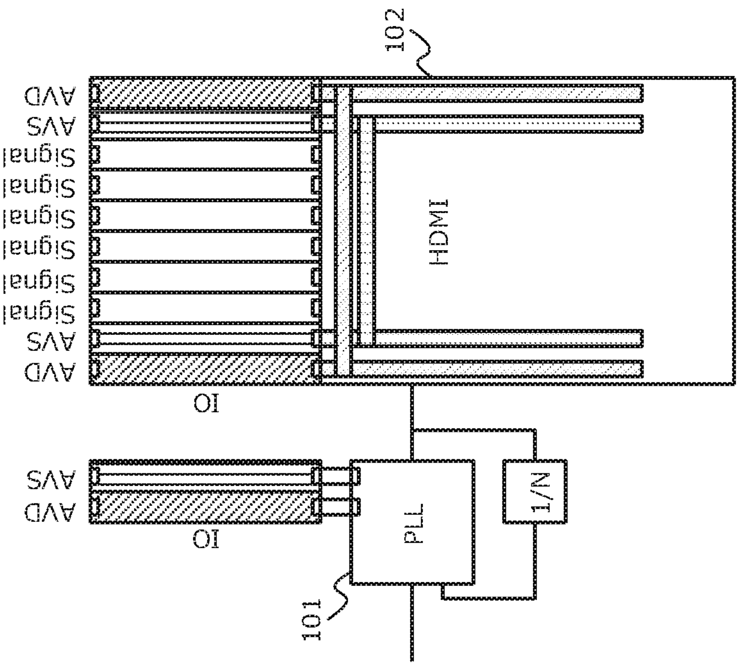

FIGS. 2A and 2B are explanatory views of an example of a PLL having dedicated 10 circuits for analog power sources. Conventionally, for example, if one PLL acting as the first partial circuit 101 is disposed in an circuit under design, two power-source I/O circuits for analog circuits dedicated for the PLL are disposed on the circuit for two power sources, i.e., Analog VDd (AVD) and Analog VSs (AVS). The PLL depicted in FIG. 2A has a power-source IO circuit for AVD and a power-source IO circuit for AVS. The PLL depicted in FIG. 2B has a power-source IO circuit for AVD and a power-source IO circuit for VSS that is a core power source, instead of AVS. In a semiconductor integrated circuit using high-tech technology, for example, about four to eight PLLs are mounted in some cases. If eight PLLs are disposed on the circuit under design, for example, 8 to 16 power-source IO circuits for analog circuits are disposed dedicated for the PLLs on the circuit under design.

If VDD and a core power source such as VSS are connected as power sources to an analog IP macro such as a PLL, jitter of the analog IP macro may increase consequent to noise from a power source of a core circuit included in the circuit under design. To eliminate this increase, measures are taken, such as connecting a power source filter to the analog IP macro to remove the noise of the core power source, which leads to problems such as power source enhancement and increased footprint.

Figure 3A:
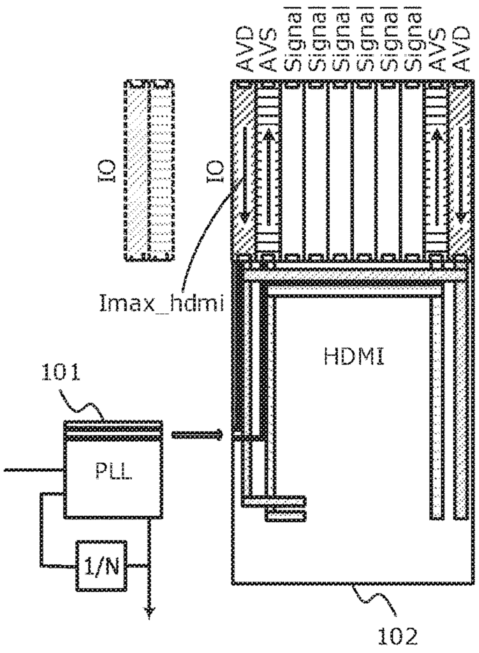
FIGS. 3A, 3B, and 3C are explanatory views of examples of connection between a PLL and an HDMI.
Figure 3B:
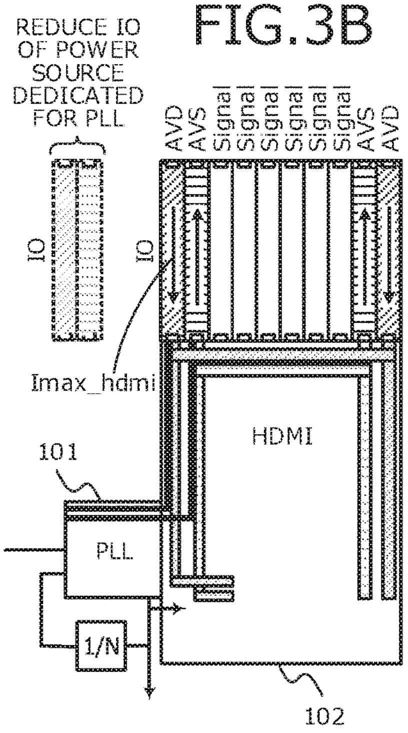
Figure 3C:
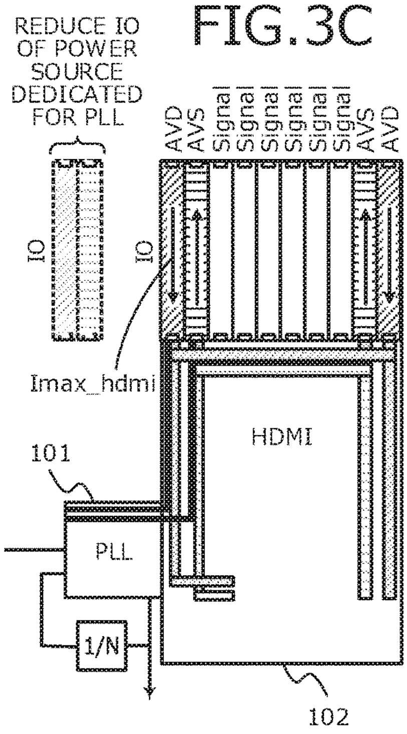

FIGS. 3A, 3B, and 3C are explanatory views of examples of connection between a PLL and an HDMI. As depicted in FIG. 3A, for example, the PLL acting as the first partial circuit 101 and the HDMI acting as the second partial circuit 102 are connected to reduce power-source I/Os dedicated for the PLL.

FIG. 3B depicts an example in which a clock signal output from the PLL is supplied to the HDMI. FIG. 3C depicts an example in which a clock signal output from the PLL is supplied to a partial circuit different from the HDMI in the circuit under design. As described above, the PLL and the HDMI are connected by a design support process as described with reference to FIG. 1 regardless of whether the HDMI is the destination of the clock signal output from the PLL.

Examples of a hardware configuration and functional blocks of the design support apparatus 100 and a detailed example of a process by the design support apparatus 100 will be described.

Figure 4:
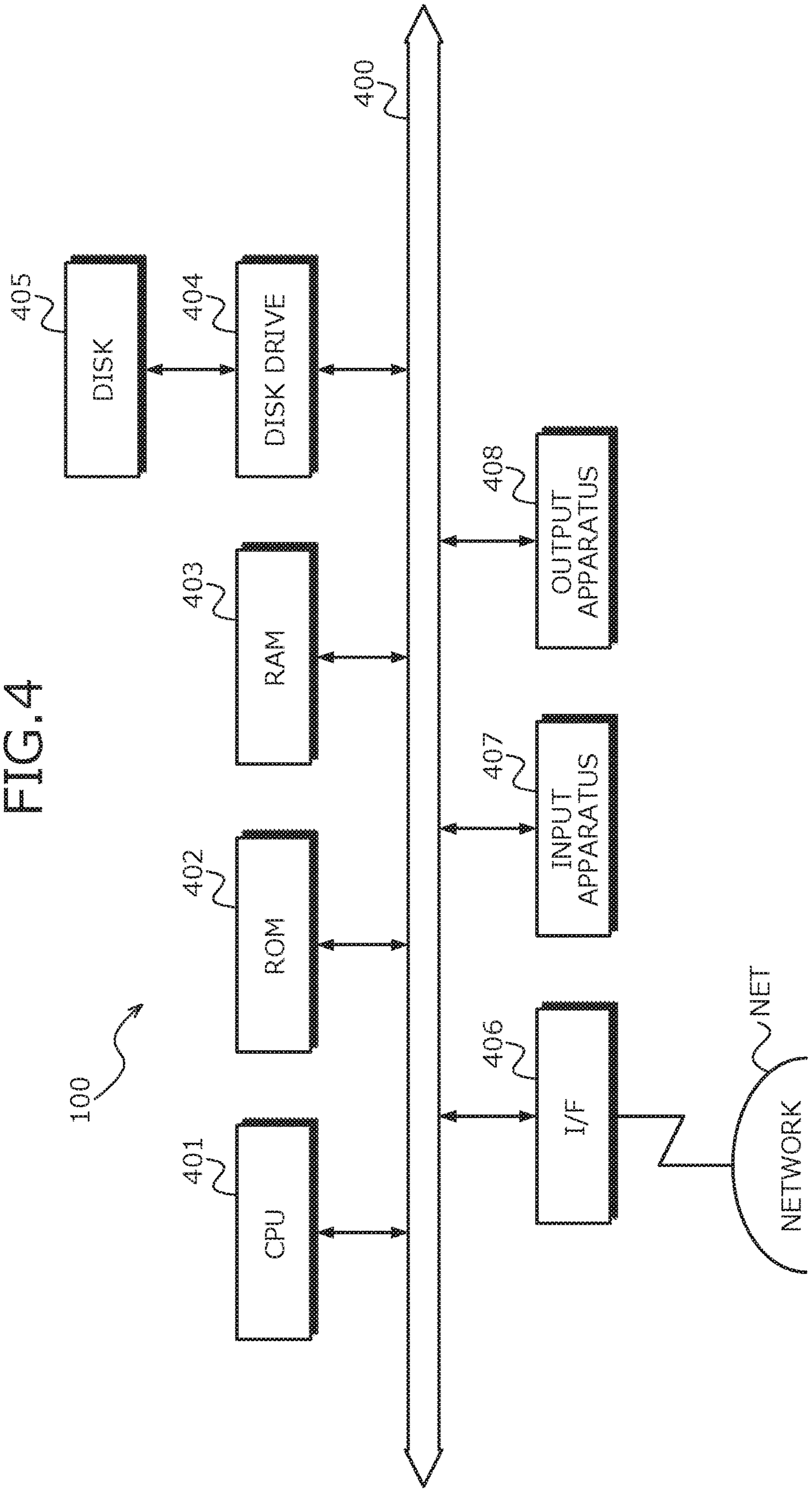
FIG. 4 is a block diagram of an example of hardware configuration of a design support apparatus 100.

FIG. 4 is a block diagram of an example of hardware configuration of the design support apparatus 100. In FIG. 4, the design support apparatus 100 has a central processing unit (CPU) 401, read-only memory (ROM) 402, random access memory (RAM) 403, a disk drive 404, and a disk 405. The design support apparatus 100 further has an interface (I/F) 406, an input apparatus 407, and an output apparatus 408. The respective components are connected by a bus 400.

Here, the CPU 401 governs overall control of the design support apparatus 100. The ROM 402 stores programs such as a boot program. The RAM 403 is used as a work area of the CPU 401. The disk drive 404, under the control of the CPU 401, controls the reading and writing of data with respect to the disk 405. The disk 405 stores data written thereto under the control of the disk drive 404. The disk 405 may be a magnetic disk, an optical disk, etc.

The I/F 406 is connected through a communications line to a network NET such as a local area network (LAN), a wide area network (WAN), the Internet, etc. and is connected to other apparatuses through the network NET. The I/F 406 administers an internal interface with the network NET and controls the input and output of date from external apparatuses. The I/F 406 may be, for example, a modem, a LAN adapter, etc.

The input apparatus 407 is an interface that inputs various types of data by user operation of a keyboard, mouse, touch panel, etc. Further, the input apparatus 407 can take in images and video from a camera. The input apparatus 407 can further take in sound from a microphone. The output apparatus 408 is an interface that outputs data according to the instruction of the CPU 401. The output apparatus 408 may be a display, a printer, etc.

Figure 5:
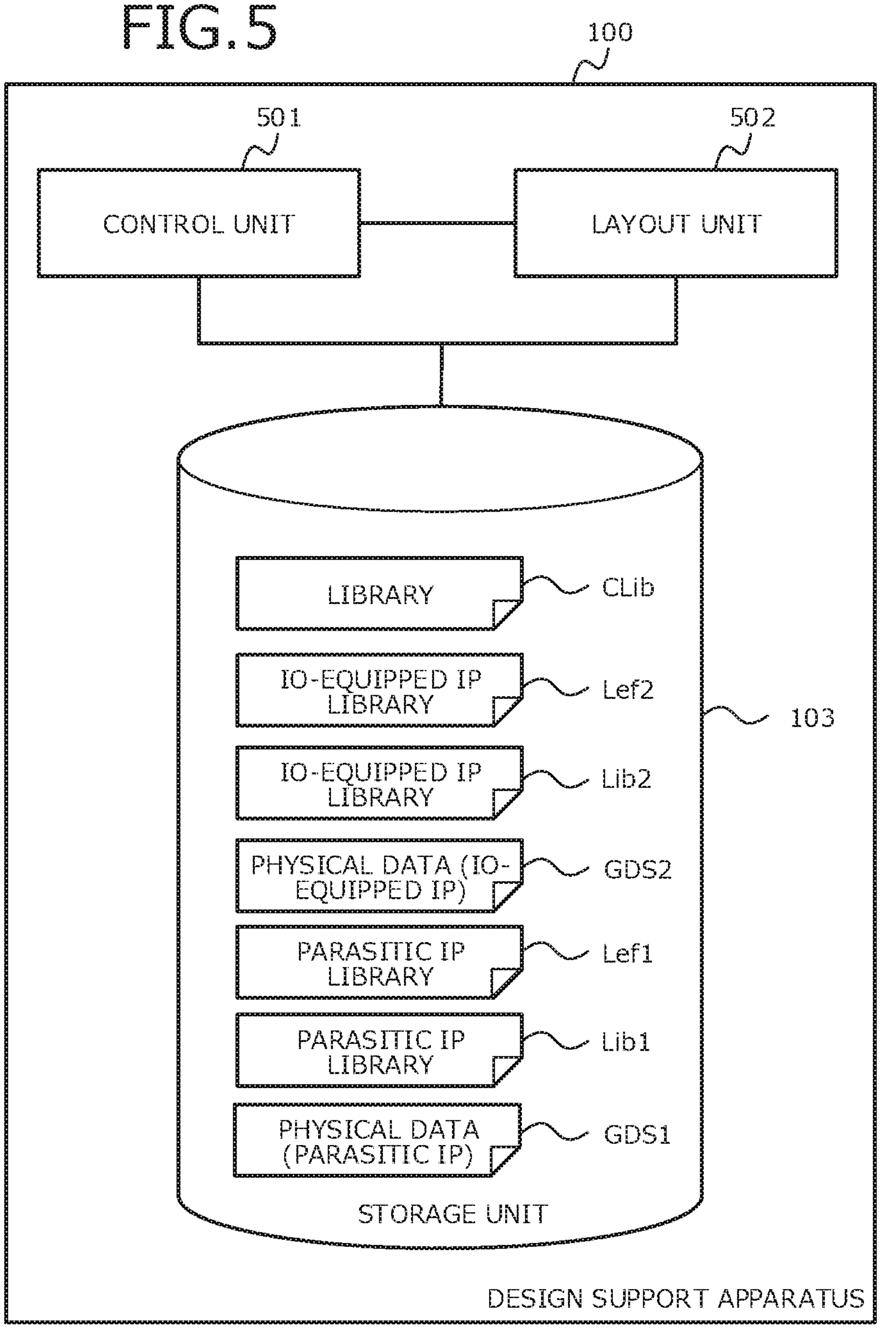
FIG. 5 is a block diagram of an example of a functional configuration of the design support apparatus 100.

FIG. 5 is a block diagram of an example of a functional configuration of the design support apparatus 100. The design support apparatus 100 has a control unit 501, a layout unit 502, and a storage unit 103. The processes of the control unit 501 and the layout unit 502 are coded in a program stored in a storage device such as the ROM 402, the RAM 403, and the disk 405 accessible by the CPU 401 depicted in FIG. 4, for example. The CPU 401 reads the program from the storage device to execute the processes coded in the program. As a result, processes of the control unit 501 are implemented. The storage unit 103 is implemented by a storage device such as the ROM 402, the RAM 403, and the disk 405, for example. Process results of the control unit 501 and the layout unit 502 are stored to the storage unit 103, for example. The layout unit 502 is a layout apparatus and is implemented by application software capable of performing place & route (P&R), for example. Although the layout unit 502 may be included in another apparatus, the design support apparatus 100 includes the layout unit 502 in this embodiment.

First, storage contents stored in the storage unit 103 will be described. The storage unit 103 stores the first information 104 depicted in FIG. 1. The first information 104 indicates the first consumption current value Ipmax during operation of the first partial circuit 101 included in the circuit under design. In the example depicted in FIG. 5, the first information 104 is a parasitic IP library Lib1. The first partial circuit 101 is an IP macro of an analog circuit. The first partial circuit 101 is herein referred to as a parasitic IP macro 101. The storage unit 103 stores the second information 105 depicted in FIG. 1. The second information 105 indicates the surplus current value Irem based on the allowable current value Imax of the power source terminal and the second consumption current value Iip during operation of the second partial circuit 102. The allowable current value Imax is a current value allowed by the power source terminal that is included in the second partial circuit 102 different from the parasitic IP macro 101 included in the circuit subject to design and that is supplied with the same power source as the parasitic IP macro 101. The second partial circuit 102 is an IP macro of an analog circuit equipped with an IO circuit for a power source. The second partial circuit 102 is herein referred to as an IO-equipped IP macro 102. The second information 105 is an IO-equipped IP library Lib2.

The storage unit 103 also stores first partial circuit information of the parasitic IP macro 101, second partial circuit information of the IO-equipped IP macro 102, and connection information for connecting the power-supplying terminal of the IO-equipped IP macro 102 and the power source terminal of the parasitic IP macro 101. The first partial circuit information is a parasitic IP library Lef1 and physical data GDS1, and the second partial circuit information is an IO-equipped IP library Lef2 and physical data GDS2. The storage unit 103 stores a library CLib. The connection information is the library CLib, for example. Before describing detailed examples of the libraries, an example of library creation will briefly be described.

Figure 6:
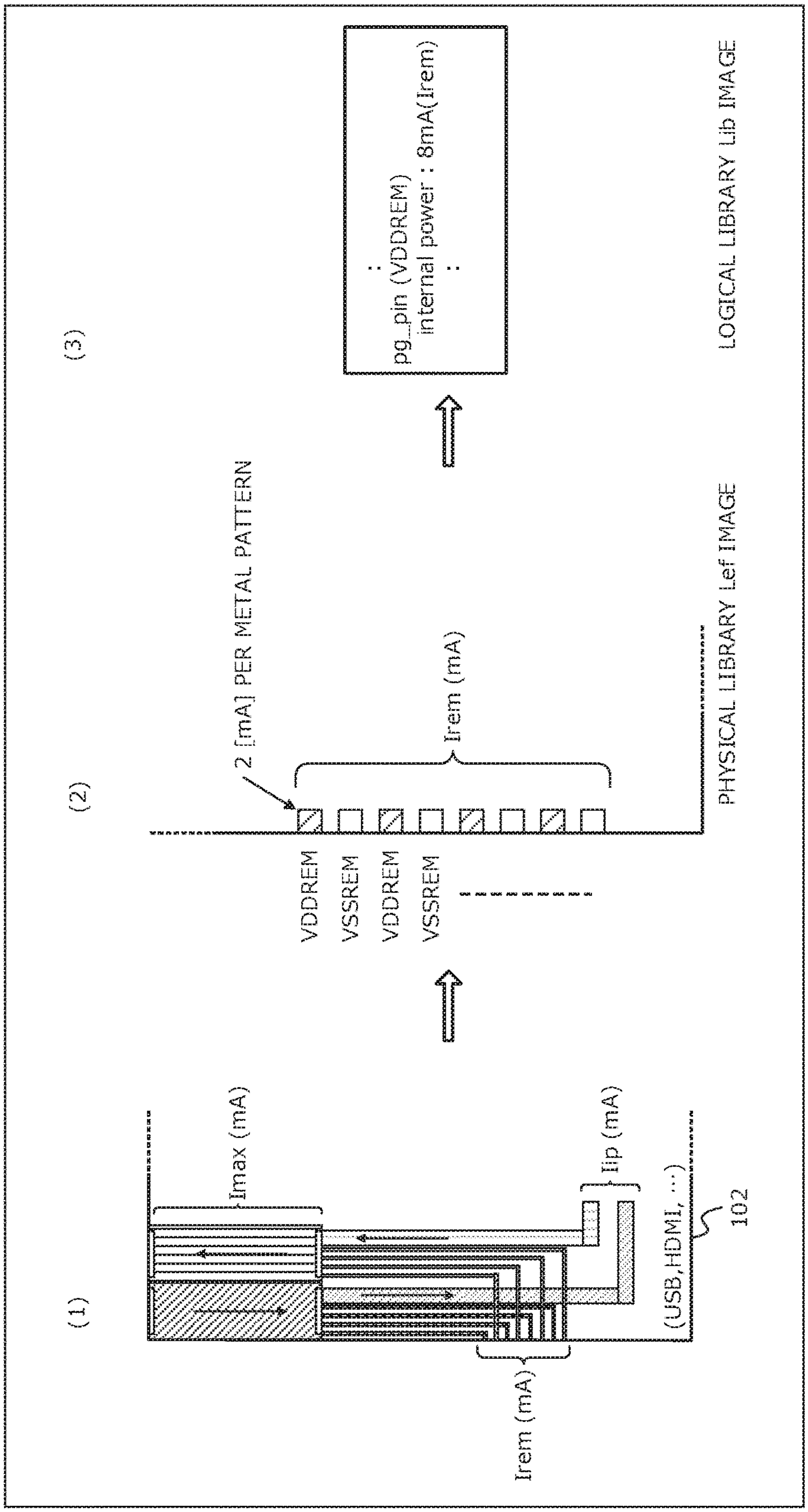
FIG. 6 is an explanatory view of an example of library creation.

FIG. 6 is an explanatory view of an example of library creation. For example, the IO-equipped IP macro 102 is an analog IP acting as a supply source of a power source and is disposed with a terminal based on the surplus current value Irem, and the IO-equipped IP macro 102 outputs the surplus current value Irem to another circuit. As depicted at (1) in FIG. 6, the allowable current value Imax is a maximum current value of the power source terminal allowed to flow through the input/output circuit for a power source, and the second consumption current value Iip is the maximum consumption current value during operation of the IO-equipped IP macro 102. As depicted at (1) in FIG. 6, the surplus current value Irem is acquired by subtracting the second consumption current value Iip from the allowable current value Imax.

In the example at (2) in FIG. 6, it is specified that 2 [mA] per metal pattern is allowable. As depicted at (2) in FIG. 6, 2 [mA]×4 metal patterns are defined for the IO-equipped IP macro 102 in a library Lef of a physical pattern related to the IO-equipped IP macro 102. This enables the IO-equipped IP macro 102 to supply 8 [mA] to another analog IP.

The library Lef is information that indicates a physical shape of a macro. The information that indicates a physical shape includes size of the macro, information that indicates terminals included in the macro, and information the indicates a wiring layer forming the terminals included in the macro. The library Lef depicted at (2) in FIG. 6 is the IO-equipped IP library Lef2 depicted in FIG. 5 and a detailed example is depicted in FIG. 8.

As depicted at (3) in FIG. 6, in a logical library Liberty (hereinafter abbreviated to "Lib") related to the IO-equipped IP macro 102, an available current value is defined with respect to the power source that can be supplied by the IO-equipped IP macro 102. This enables determination concerning connection propriety in P&R. The library Lib is a logical library and has information that indicates a current source. The library Lib depicted at (3) in FIG. 6 is the IO-equipped IP library Lib2 depicted in FIG. 5 and a detailed example is depicted in FIG. 11.

Figure 7:
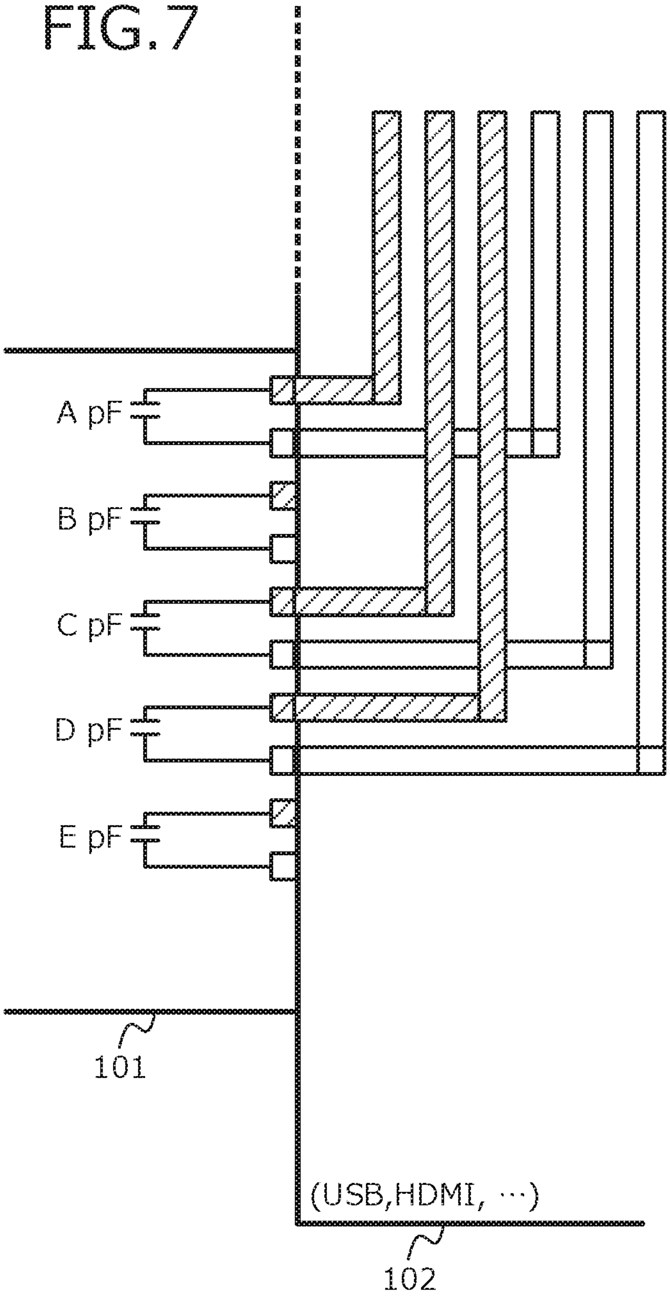
FIG. 7 is an explanatory view of an example of an analog IP disposed with a power source filter.

FIG. 7 is an explanatory view of an example of an analog IP disposed with a power source filter. Since the IO-equipped IP macro 102 has inherent frequency noise, a designer may preliminarily design the parasitic IP macro 101 equipped with a power source filter to remove a certain frequency. The number of equipped power source filters is not particularly limited. For example, if the power source terminal of the parasitic IP macro 101 and the power-supplying terminal of the IO-equipped IP macro 102 are connected in the layout design, the power source filters may be switched by analog switches between enabled and disabled. As a result, a low pass filter (LPF) can be constructed by the power source filters. FIG. 7 depicts an example in which capacitances A to E [pF] are provided as the power source filters. In the case of the IO-equipped IP macro 102 that is a high-speed IP operated by a high-frequency clock signal, when the frequency used has been decided, the designer can determine a pattern of terminal arrangement in advance to remove the power source noise of the high-speed IP.

FIG. 8 is an explanatory view of an example of the IO-equipped IP library Lef2. The IO-equipped IP library Lef2 is information that indicates a physical shape of the IO-equipped IP macro 102. The IO-equipped IP library Lef2 defines VDDREM terminals corresponding to the surplus current value Irem. The IO-equipped IP library Lef2 defines VSSREM terminals corresponding to the surplus current value Irem.

FIG. 9 is an explanatory view of an example of the parasitic IP library Lef1. The parasitic IP library Lef1 is information that indicates a physical shape of the parasitic IP macro 101. The parasitic IP library Lef1 defines VDDREM terminals corresponding to the first consumption current value Ipmax. The parasitic IP library Lef1 defines VSSREM terminals corresponding to the first consumption current value Ipmax.

FIG. 10 is an explanatory view of an example of the library CLib. The library CLib defines a connection relationship between the power source terminal of the IO-equipped IP macro 102 and the power source as well as a connection relationship between the power source terminal of the parasitic IP macro 101 and the power source.

FIG. 11 is an explanatory view of an example of the IO-equipped IP library Lib2. The IO-equipped IP library Lib2 is information that indicates a current value, etc. related to the IO-equipped IP macro 102. The IO-equipped IP library Lib2 defines a value of current applicable to the VDREM terminals.

FIG. 12 is an explanatory view of an example of the parasitic IP library Lib1. The parasitic IP library Lib1 is information that indicates current value, etc. related to the parasitic IP macro 101. The parasitic IP library Lib1 defines a value of a current supplied to the VDREM terminals.

First, the control unit 501 compares the first consumption current value Ipmax indicated by the parasitic IP library Lib1 stored in the storage unit 103 with the surplus current value Irem indicated by the IO-equipped IP library Lib2 stored in the storage unit 103. The control unit 501 controls the layout apparatus to generate circuit information that indicates a circuit connecting the power-supplying terminal of the IO-equipped IP macro 102 and the power source terminal of the parasitic IP macro 101 in the object circuit depending on the comparison result. The power-supplying terminal of the IO-equipped IP macro 102 is a terminal capable of supplying to another circuit, the power supplied to the power source terminal of the IO-equipped IP macro 102. As described above, although the design support apparatus 100 includes the layout apparatus in this embodiment, this is not a limitation and the layout apparatus may be included in another apparatus. In this example, the layout unit 502 is the layout apparatus, as described above.

For example, a value of the current applicable to the VDDRME terminals defined in the parasitic IP library Lib1 is the first consumption current value Ipmax. For example, a value of the current supplied to the VDDRME terminals defined in the IO-equipped IP library Lib2 is the surplus current value Irem. The first consumption current value Ipmax is the maximum consumption current value during operation of the parasitic IP macro 101. The maximum consumption current value is, for example, a value defined based on design specifications, an empirical value, etc.

As a process of the comparison, for example, the control unit 501 determines whether the surplus current value Irem is greater than the first consumption current value Ipmax by a predetermined value or more. For example, the predetermined value is a value equal to or greater than zero and is a value defined in advance by a user of the design support apparatus 100, etc. For example, if the predetermined value is zero, the control unit 501 determines whether the surplus current value Irem is equal to or greater than the first consumption current value Ipmax. Alternatively, for example, if the predetermined value is a value equal to or greater than one, the control unit 501 determines whether a value obtained by giving a margin to the surplus current value Irem is equal to or greater than the first consumption current value Ipmax.

As a process of providing control, for example, the control unit 501 controls the layout apparatus to generate circuit information based on the IO-equipped IP library Lib2, the parasitic IP library Lib1, and the library CLib stored in the storage unit 103. This circuit information is the layout data 107 that represents the circuit 160 as depicted in FIG. 1, for example. This circuit information is included in layout data that represents the circuit under design, generated by the layout unit 502.

For example, when determining that the surplus current value Irem is not greater than the first consumption current value Ipmax by the predetermined value or more, the control unit 501 does not control the layout apparatus to generate the circuit information. For example, the control unit 501 outputs information indicating that the power-supplying terminal of the IO-equipped IP macro 102 is not connected to the power source terminal of the parasitic IP macro 101. With regard to the form of output, the information may be output via the output device 408, the storage unit 103, and the network NET to another apparatus etc. In a more specific example, the control unit 501 may display an error message on a display, etc., or may store into the storage unit 103, information describing the error message. In a more specific example, the control unit 501 may store the information to a storage device of another apparatus through the network NET or may display the error message on a display of another apparatus through the network NET.

Figure 13A:
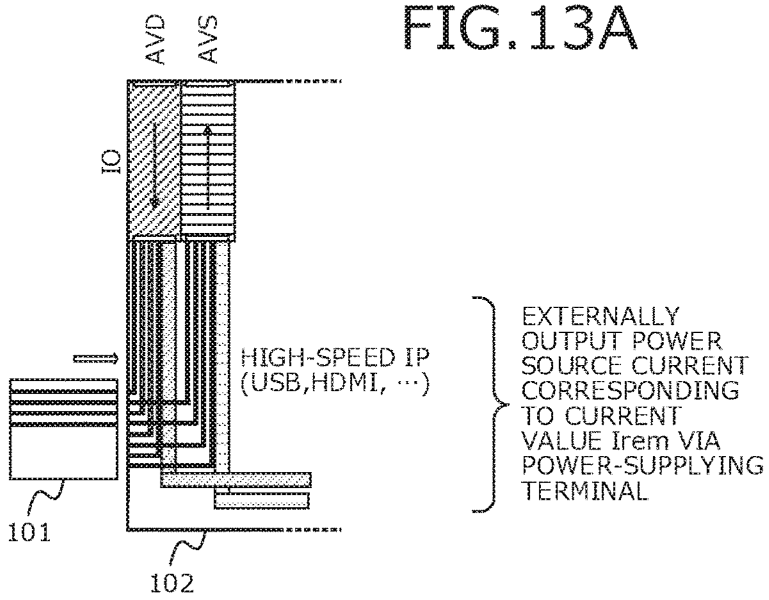
FIGS. 13A, 13B, and 13C are explanatory views of a connection example 1.
Figure 13B:
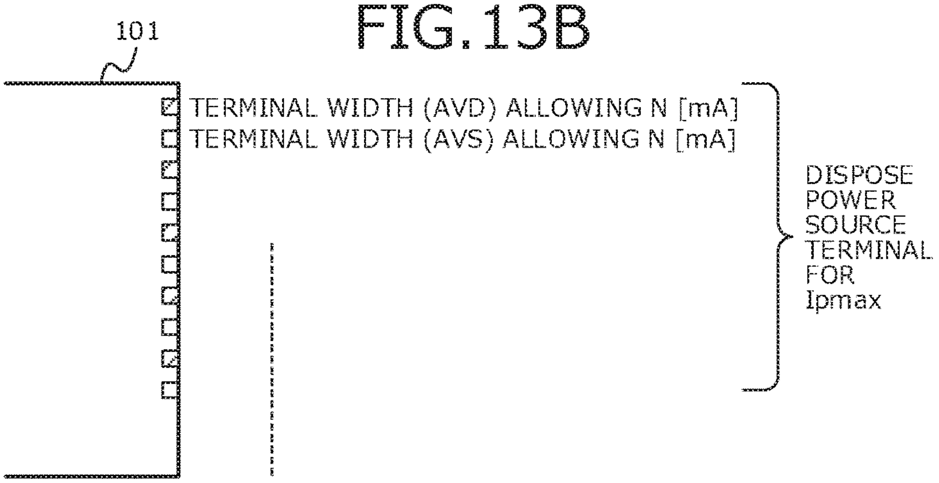
Figure 13C:
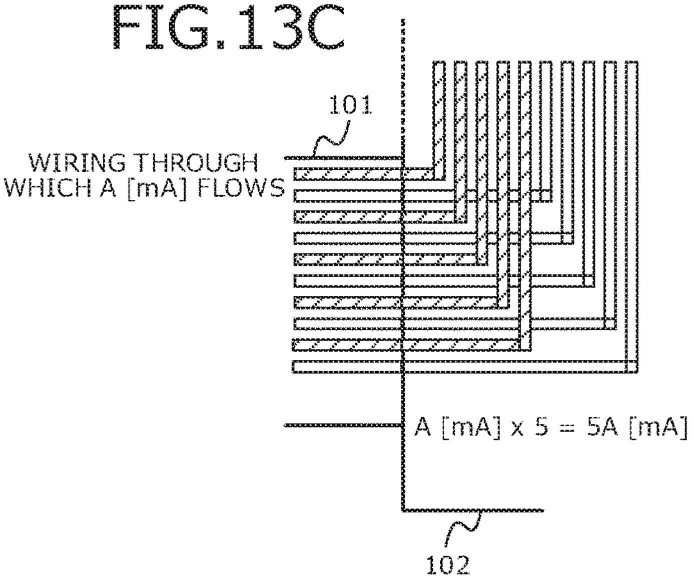

FIGS. 13A, 13B, and 13C are explanatory views of a connection example 1. As depicted in FIG. 13A, by disposing the power-supplying terminals on the IO-equipped IP macro 102, the power source current corresponding to the surplus current value Irem can be output externally. As depicted in FIG. 13B, the parasitic IP macro 101 is disposed with the power source terminals capable of receiving the power source current corresponding to the first consumption current value Ipmax of the parasitic IP macro 101. For example, when the first consumption current value Ipmax of the parasitic IP macro 101 is 5 [mA] and the allowable current value Imax of the terminal is 1 [mA], the parasitic IP macro 101 is disposed with five pairs of the power source terminals for AVD and the power source terminals for AVS. As depicted in FIG. 13C, the power-supplying terminals of the IO-equipped IP macro 102 are connected to the power source terminals of the parasitic IP macro 101.

Figure 14:
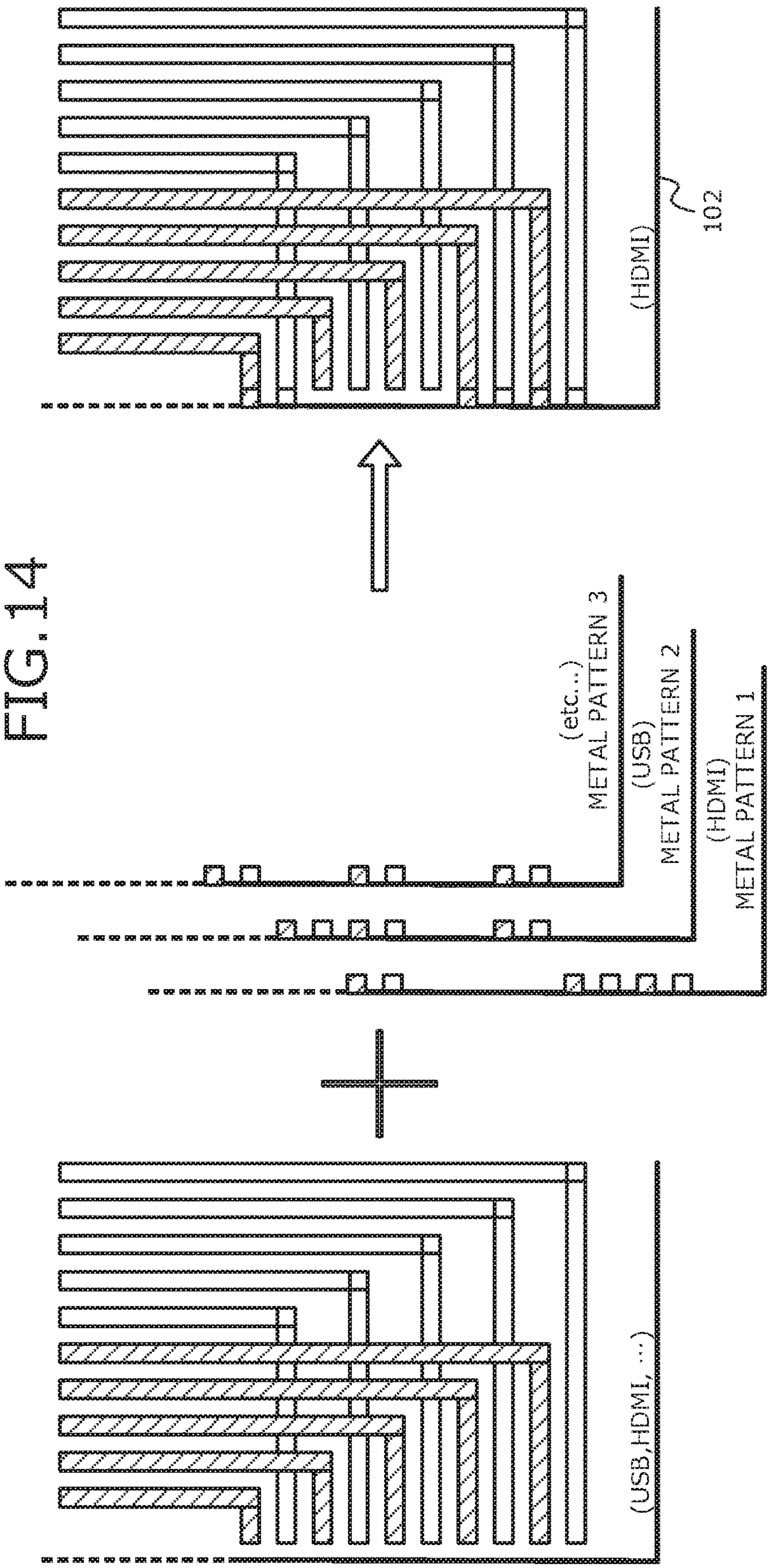
FIG. 14 is an explanatory view of a connection example 2.

FIG. 14 is an explanatory view of a connection example 2. FIG. 14 depicts an example of making a rule for a wiring pattern of the power-supplying terminals of the IO-equipped IP macro 102. As described above, if the IO-equipped IP macro 102 is a high-speed IP macro, the IO-equipped IP macro 102 operates at a standardized frequency. Therefore, a power-source noise amount of the IO-equipped IP macro 102 is determined depending on the frequency.

For example, the operating frequency of HDMI corresponds to clock signals of 74.25 [MHz] and 148.5 [MHz] and the operating frequency of Universal Serial Bus (USB) 2.0 is 480 [MHz]. Therefore, for example, as depicted in FIG. 14, the designer makes a rule by setting the power-supplying terminals of HDMI as a metal pattern 1 and the power-supplying terminals of USB as a metal pattern 2. Making a rule means that, for example, the designer prepares information that indicates metal patterns of power-supplying terminals corresponding to types of the IO-equipped IP macro 102 as the physical data GDS2 in advance. Additionally, making a rule means that the designer preliminarily defines the power-supplying terminals following the metal patterns for the respective types of the IO-equipped IP macro 102 in the IO-equipped IP library Lef2. As depicted in FIG. 14, a metal pattern from the power source terminals of the IO-equipped. IP macro 102 to the power-supplying terminals of the IO-equipped IP macro 102 is set as a common layout pattern. Setting a common layout pattern means that, for example, information that indicates a metal pattern between the power source terminals of the IO-equipped IP macro 102 and the power-supplying terminals of the IO-equipped IP macro 102 is prepared in advance as the physical data GDS2. As a result, the number of the power-supplying terminals used can be changed depending on the type of the IO-equipped IP macro 102. Therefore, the layout design can be facilitated.

Figure 15A:
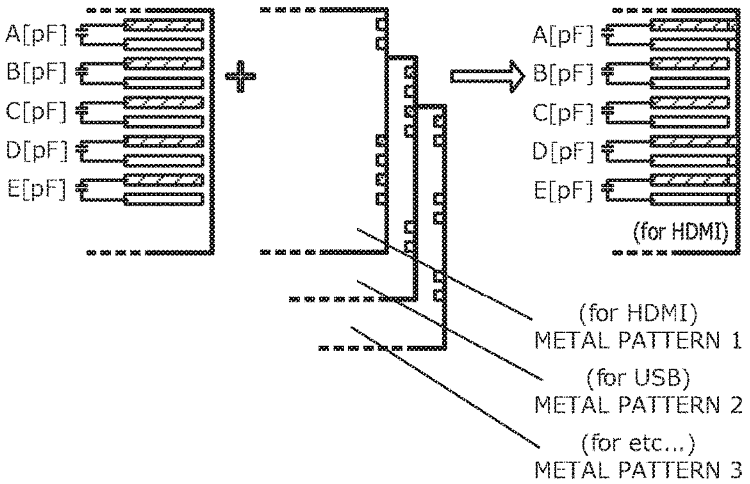
FIGS. 15A, 15B, 15C, and 15D are explanatory views of a connection example 3.
Figure 15B:
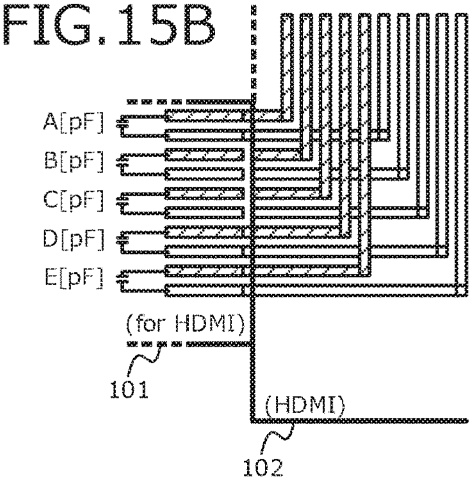

FIGS. 15A, 15B, 15C, and 15D are explanatory views of a connection example 3. As described above, if the IO-equipped IP macro 102 is a high-speed IP macro, the IO-equipped IP macro 102 operates at a standardized frequency. Therefore, a power-source noise amount of the IO-equipped IP macro 102 is determined according to the frequency. Therefore, as depicted in FIG. 15A, the designer prepares information that indicates layout patterns representative of the parasitic IP macro 101 equipped with power source filters as the physical data GDS1 in advance. As depicted in FIG. 15B, the designer prepares information that indicates metal patterns of the power source terminals for the respective types of the IO-equipped IP macro 102 as the physical data GDS1 in advance. As a result, power source filters can be achieved according to the type of the IO-equipped IP macro 102 from a layout pattern in which the parasitic IP macro 101 is equipped with the power source filters and a metal pattern selected according to the type of the IO-equipped IP macro 102. Therefore, the layout design can be facilitated. For example, as depicted in FIG. 15, when a metal pattern 1 for HDMI is selected, a layout pattern can be implemented in which a power source filter A, a power source filter D, and a power source filter E are enabled.

FIG. 15B depicts a connection example of the IO-equipped IP macro 102 and the parasitic IP macro 101 when the IO-equipped IP macro 102 is HDMI. As depicted in FIG. 15B, for example, the number of the power source filters mounted on the parasitic IP macro 101 may be determined according to the number of the power-supplying terminals of the IO-equipped IP macro 102.

Figure 15C:
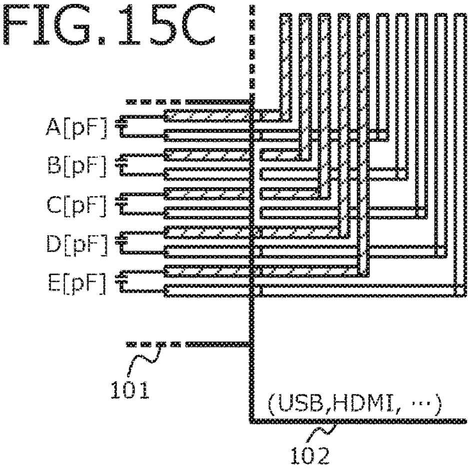

Alternatively, as depicted in FIG. 15C, multiple metal patterns of the power-supplying terminals of the IO-equipped IP macro 102 may be prepared, and the power source filters corresponding to the type of the IO-equipped IP macro 102 may be achieved according to a metal pattern of the power-supplying terminal of the IO-equipped IP macro 102.

Figure 15D:
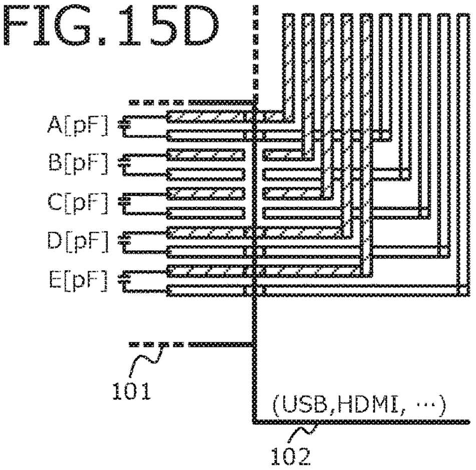

Alternatively, as depicted in FIG. 15D, multiple metal patterns of the power-supplying terminals of the IO-equipped IP macro 102 is prepared along with multiple metal patterns of the power source terminals of the parasitic IP macro 101. The power source filters corresponding to the type of the IO-equipped IP macro 102 may be achieved according to the metal pattern of the power-supplying terminals of the IO-equipped IP macro 102 and the metal patterns.

Figure 16:
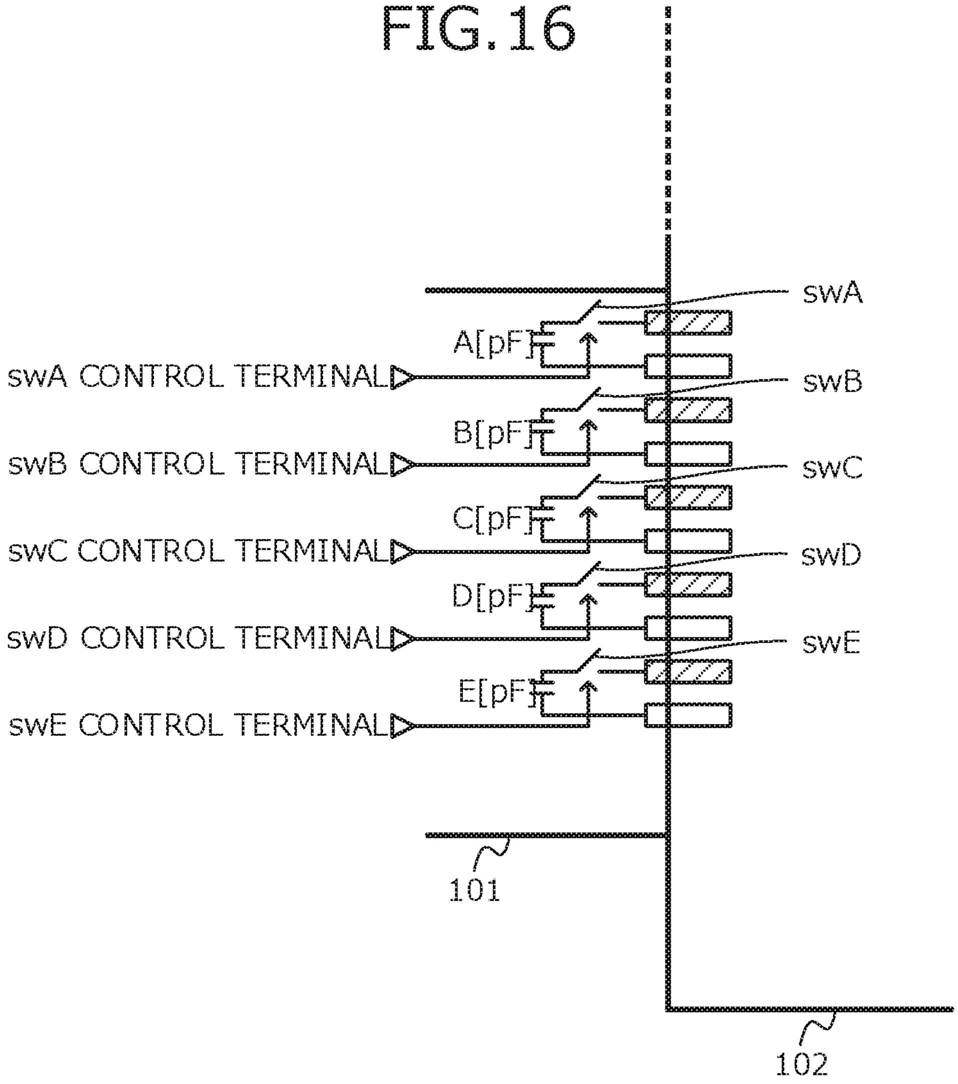
FIG. 16 is an explanatory view of a connection example 4.

FIG. 16 is an explanatory view of a connection example 4. As depicted in FIG. 16, analog switches swA to swE may be disposed on the respective power source terminals of the parasitic IP macro 101. As depicted in FIG. 16, each of the analog switches has a corresponding control terminal and is controlled to be turned on/off by receiving a control signal at the control terminal. Since the turning on/off of the analog switches is controlled based on the control signals, the power source filters to be used can be determined after the IO-equipped IP macro 102 is determined.

Figure 17:
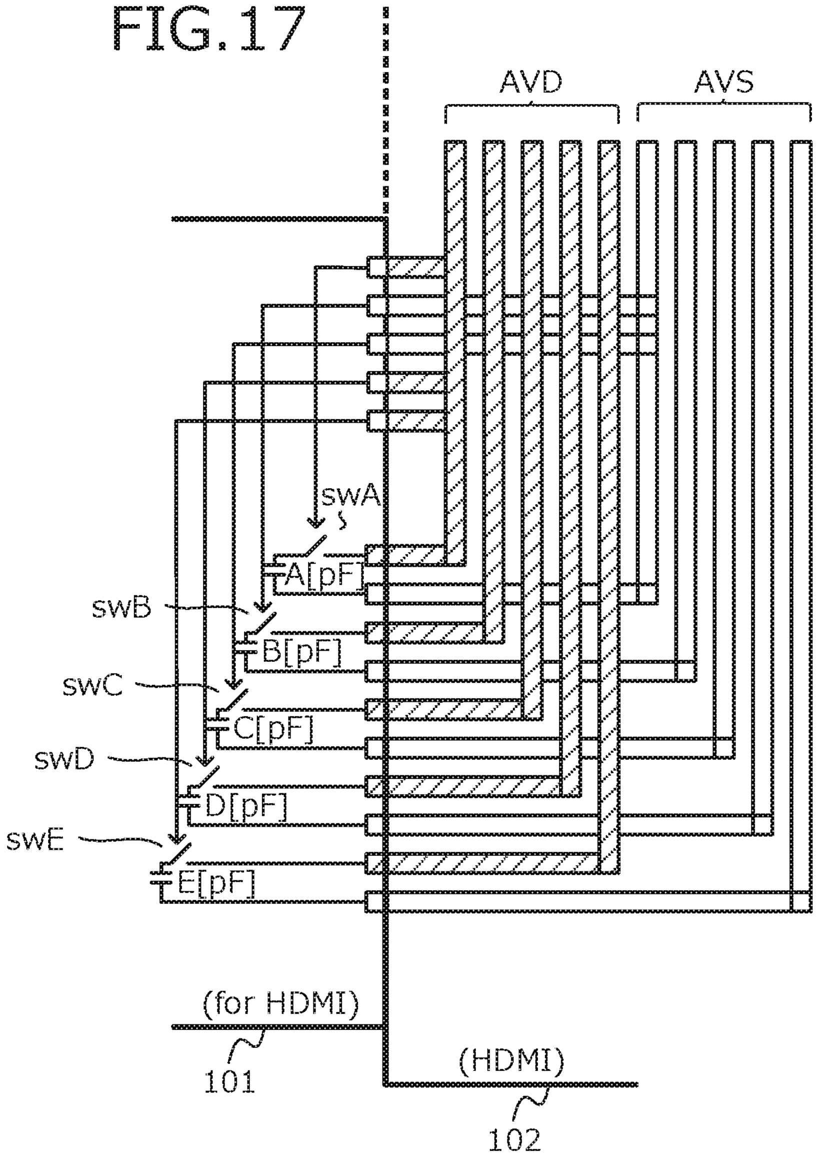
FIG. 17 is an explanatory view of a power source filter control setting example 1.

FIG. 17 is an explanatory view of a power source filter control setting example 1. For example, in the physical data GDS1 and the parasitic IP library Lef1 of the parasitic IP macro 101, the parasitic IP macro 101 has control terminals for controlling the power source filters. For example, in the physical data GDS2 and the IO-equipped IP library Lef2 of the IO-equipped IP macro 102, the IO-equipped IP macro 102 has control terminals connectable to either AVD or AVS. As depicted in FIG. 17, by connecting the parasitic IP macro 101 and the IO-equipped IP macro 102, the power source filters can be switched between enabled and disabled. For example, by connecting AVD to the control terminals of the IO-equipped IP macro 102, the power source filters corresponding to the control terminals are enabled. For example, by connecting AVS to the control terminals of the IO-equipped IP macro 102, the power source filters corresponding to the control terminals are disabled.

In the example depicted in FIG. 17, AVD is supplied to the control terminals of the power source filters A, D, and E among the control terminals of the parasitic IP macro 101. In the example depicted in FIG. 17, AVS is supplied to the control terminal of the power source filter B and the control terminal of the power source filter C among the control terminals of the parasitic IP macro 101. Therefore, in the example depicted in FIG. 17, the power source filters A, D, and E are enabled and the power source filters B and C are disabled.

Figure 18:
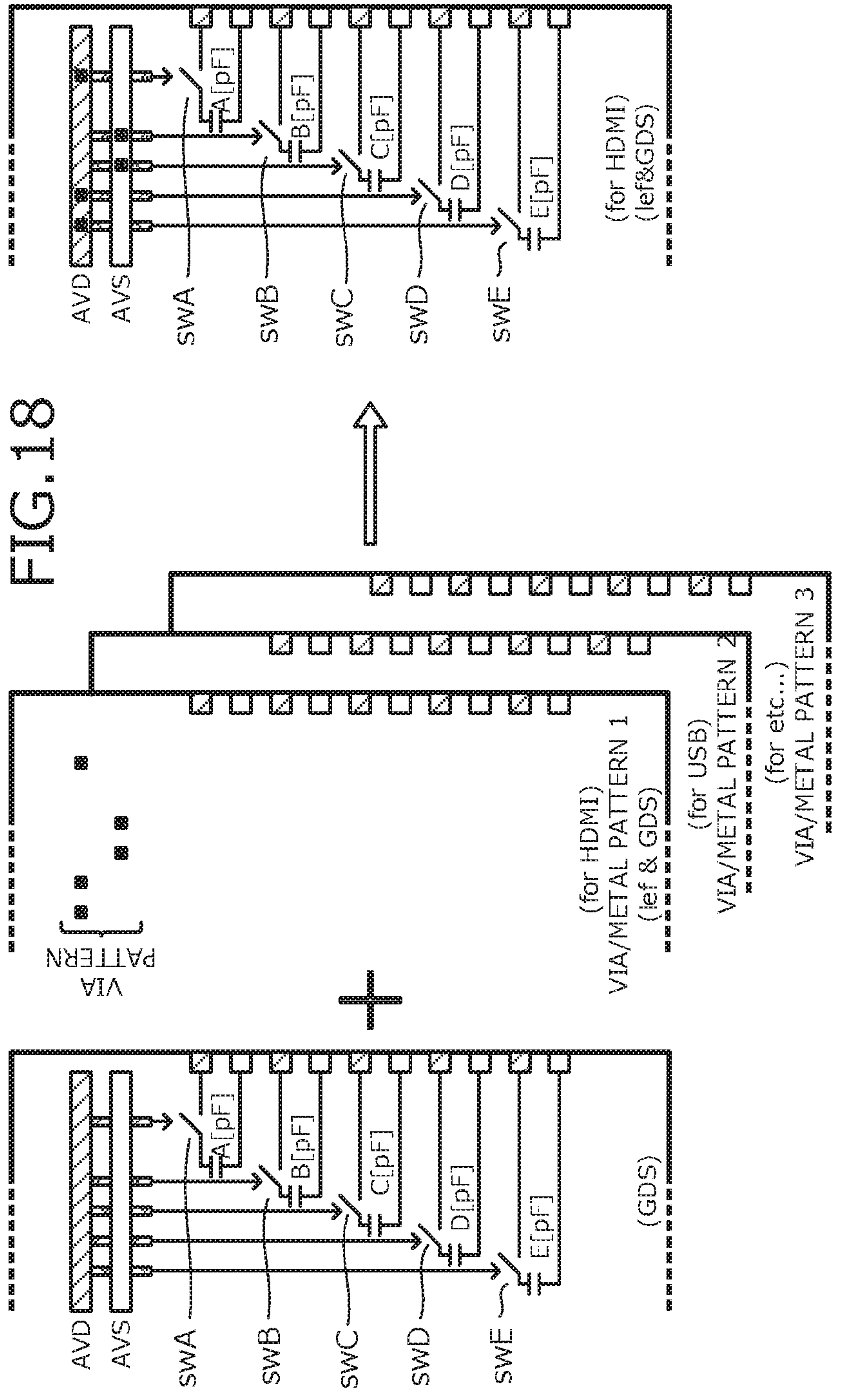
FIG. 18 is an explanatory view of a power source filter control setting example 2.

FIG. 18 is an explanatory view of a power source filter control setting example 2. For example, the designer prepares the physical data GDS1 as information that indicates a metal pattern for setting the power source filters of the parasitic IP macro 101. Additionally, the designer prepares the physical data GDS1 and the parasitic IP library Lef1 as information that indicates via patterns of the respective types of the IO-equipped IP macro 102. As depicted in FIG. 18, the via pattern corresponding to the type of the IO-equipped IP macro 102 to be connected is selected so as to perform design such that the selected via pattern and the metal pattern for setting the power source filters overlap each other. As a result, each of the power source filters of the parasitic IP macro 101 can be set to be enabled or disabled.

Figure 19:
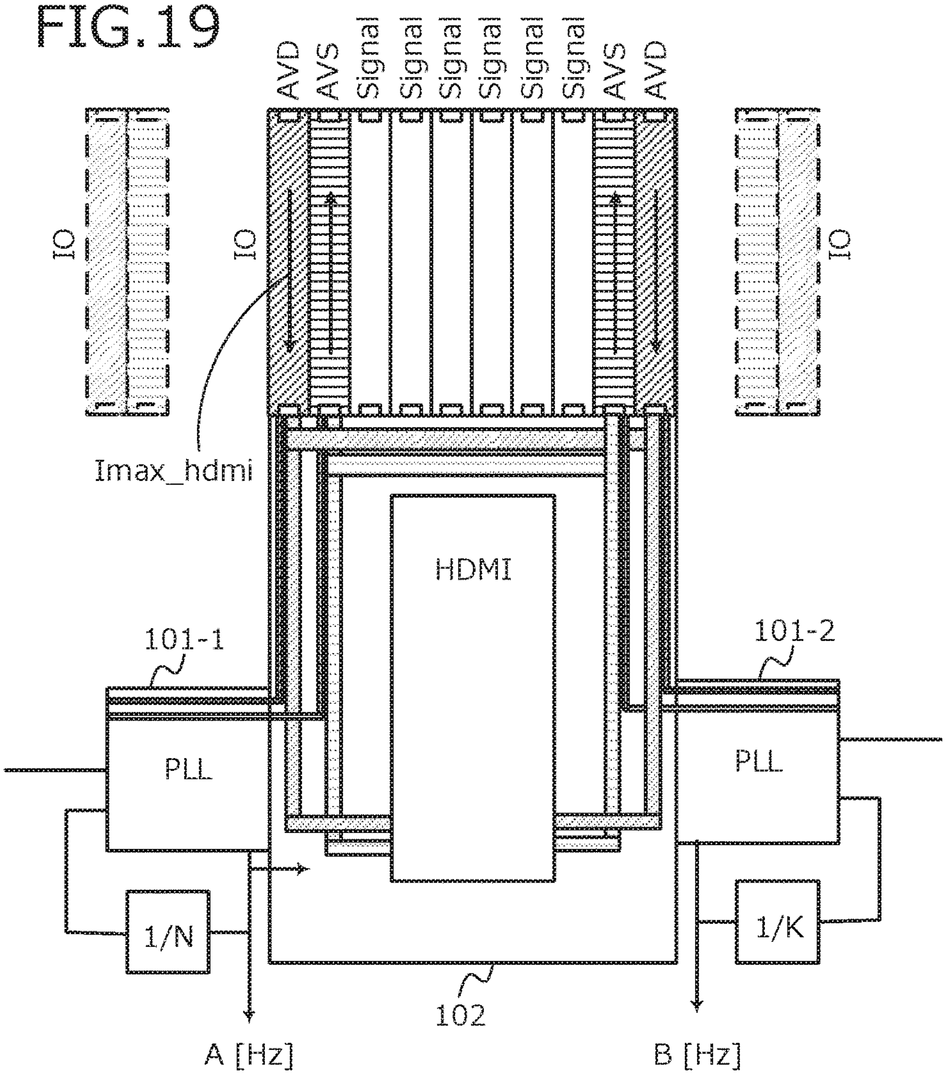
FIG. 19 is an explanatory view of a connection example of the parasitic IP macros 101 and the IO-equipped IP macro 102.

FIG. 19 is an explanatory view of a connection example of the parasitic IP macros 101 and the IO-equipped IP macro 102. As depicted in FIG. 19, if the surplus current value Irem of the IO-equipped IP macro 102 is equal to or greater than the first consumption current values Ipmax of the parasitic IP macros 101, the parasitic IP macros 101 and the IO-equipped IP macro 102 may be designed to be connected.

Figure 20:
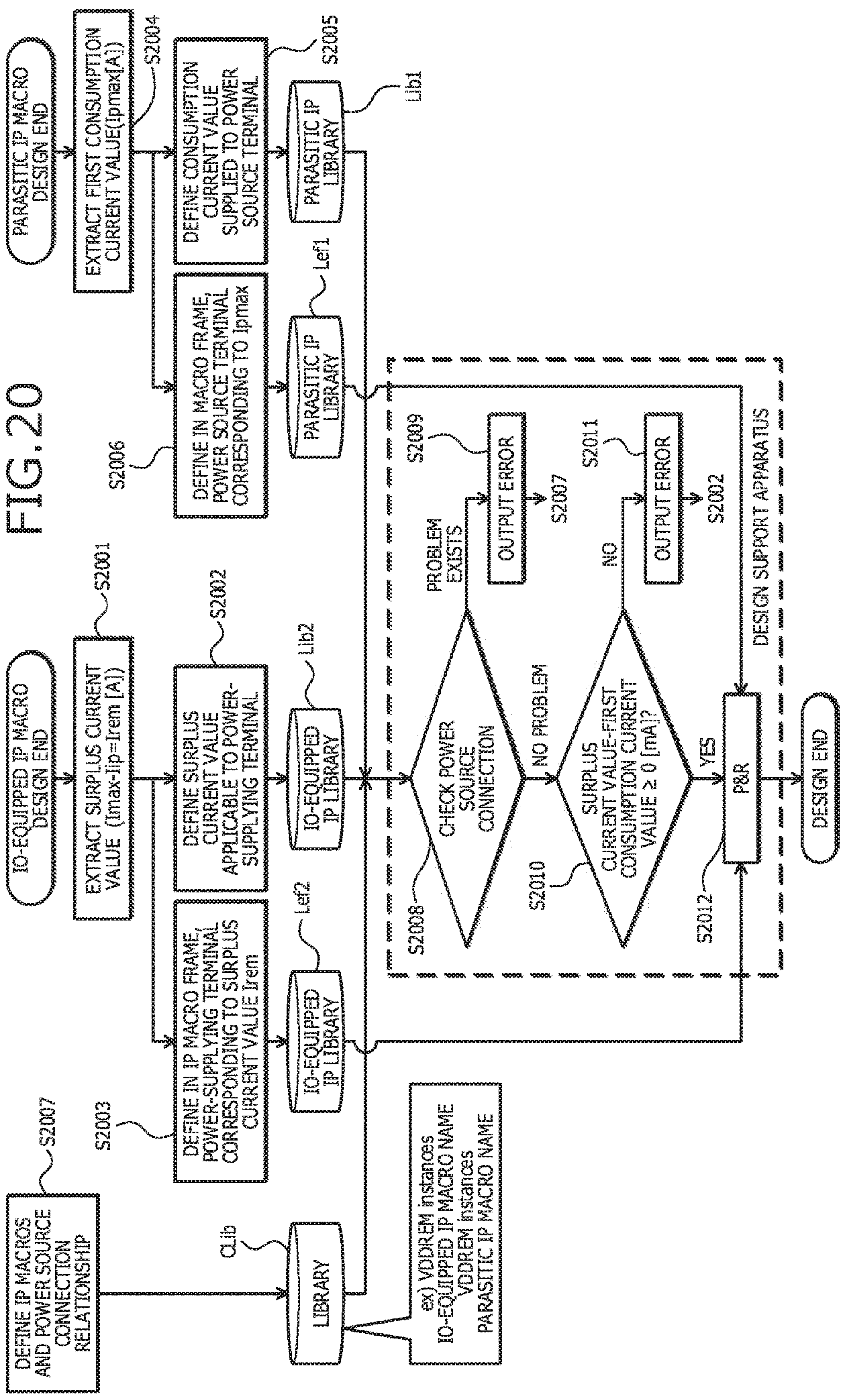
FIG. 20 is a flowchart (part 1) of a design support process procedure example.

FIG. 20 is a flowchart (part 1) of a design support process procedure example. First, the designer performs an operation of adding and changing the storage contents in the storage unit 103 through the input device 407. After completing the design of the IO-equipped IP macro 102, the designer extracts the surplus current value Irem of the IO-equipped IP macro 102 (step S2001). As described above, the surplus current value Irem is a value obtained by subtracting the second consumption current value Iip from the allowable current value Imax. The designer defines the surplus current value Irem applicable to the power-supplying terminal in the IO-equipped IP library Lib2 (step S2002). The designer defines the power-supplying terminals corresponding to the surplus current value Irem in an IP macro frame of the IO-equipped IP library Lef2 (step S2003).

The designer extracts the first consumption current value Ipmax of the operation of the parasitic IP macro 101 (step S2004). For example, the first consumption current value Ipmax is extracted according to the type and number of cells, or the frequency during operation, of the parasitic IP macro 101. The designer then defines the first consumption current value Ipmax supplied to the power source terminal in the parasitic IP library Lib1 (step S2005). The designer defines the power source terminals corresponding to the first consumption current value Ipmax in a macro frame of the parasitic IP library Lef1 (step S2006).

The designer defines the IP macros and the power source connection relationship of the IP macros in the library CLib (step S2007).

The design support apparatus 100 refers to the library CLib to check whether a problem exists in the power source connection (step S2008). If it is determined that a problem exists in the power source connection (step S2008: PROBLEM EXISTS), the design support apparatus 100 outputs an error (step S2009) and returns to step S2007. If it is determined that no problem exists in the power source connection (step S2008: NO PROBLEM), the design support apparatus 100 determines whether "the surplus current value Irem—the first consumption current value Ipmax≥0 [mA]" is satisfied (step S2010).

If it is determined that "the surplus current value Irem—the first consumption current value Ipmax≥0 [mA]" is not satisfied (step S2010: NO), the design support apparatus 100 outputs an error (step S2011) and returns to step S2002. If it is determined that "the surplus current value Irem—the first consumption current value Ipmax≥0 [mA]" is satisfied (step S2010: YES), the design support apparatus 100 performs P&R (step S2012) and terminates a series of the processes of the layout design. As described above, the design support apparatus 100 is the layout apparatus in this embodiment.

Figure 21:
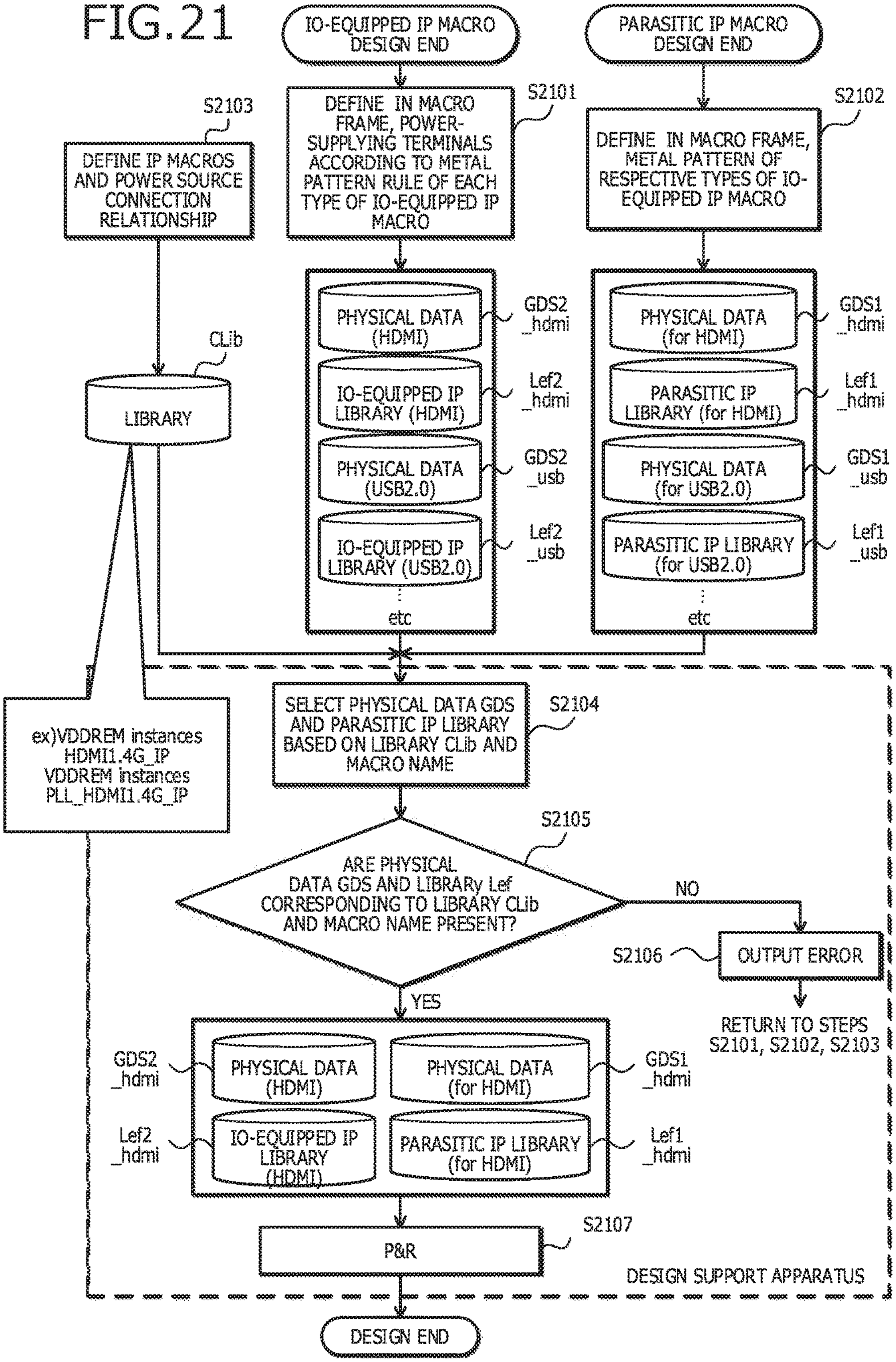
FIG. 21 is a flowchart (part 2) of a design support process procedure example.

FIG. 21 is a flowchart (part 2) of a design support process procedure example. In this example, the designer performs an operation of adding and changing the storage contents in the storage unit 103 through the input device. FIG. 21 depicts an example in which the parasitic IP macro 101 is connected to HDMI. After completion of design of the IO-equipped IP macro 102, the designer defines power-supplying terminals according to a metal pattern rule of each type of the IO-equipped IP macro 102 in the physical data GDS2 and a macro frame of the IO-equipped IP library Lef2 (step S2101). After completion of design of the parasitic IP macro 101, the designer defines the metal patterns of the respective types of the IO-equipped IP macro 102 in the physical data GDS1 and a macro frame of the parasitic IP library Lef1 (step S2102). The designer defines the IP macros and the power source connection relationship of the IP macros (step S2103).

The design support apparatus 100 selects the physical data GDS1, GDS2 and the parasitic IP libraries Lef1, Lef2 based on the library CLib and the macro name (step S2104). The design support apparatus 100 determines whether the physical data GDS1, GDS2 and the parasitic IP libraries Lef1, Lef2 corresponding to the library CLib and the macro name are present in the storage unit 103 (step S2105). If it is determined that the physical data GDS1, GDS2 and the parasitic IP libraries Lef1, Lef2 are not present in the storage unit 103 (step S2105: NO), the design support apparatus 100 outputs an error (step S2106) and returns to steps S2101 to S2103.

If it is determined that the physical data GDS1, GDS2 and the parasitic IP libraries Lef1, Lef2 are present in the storage unit 103 (step S2105: YES), the design support apparatus 100 performs P&R (step S2107) and terminates a series of the processes of the layout design.

Figure 22:
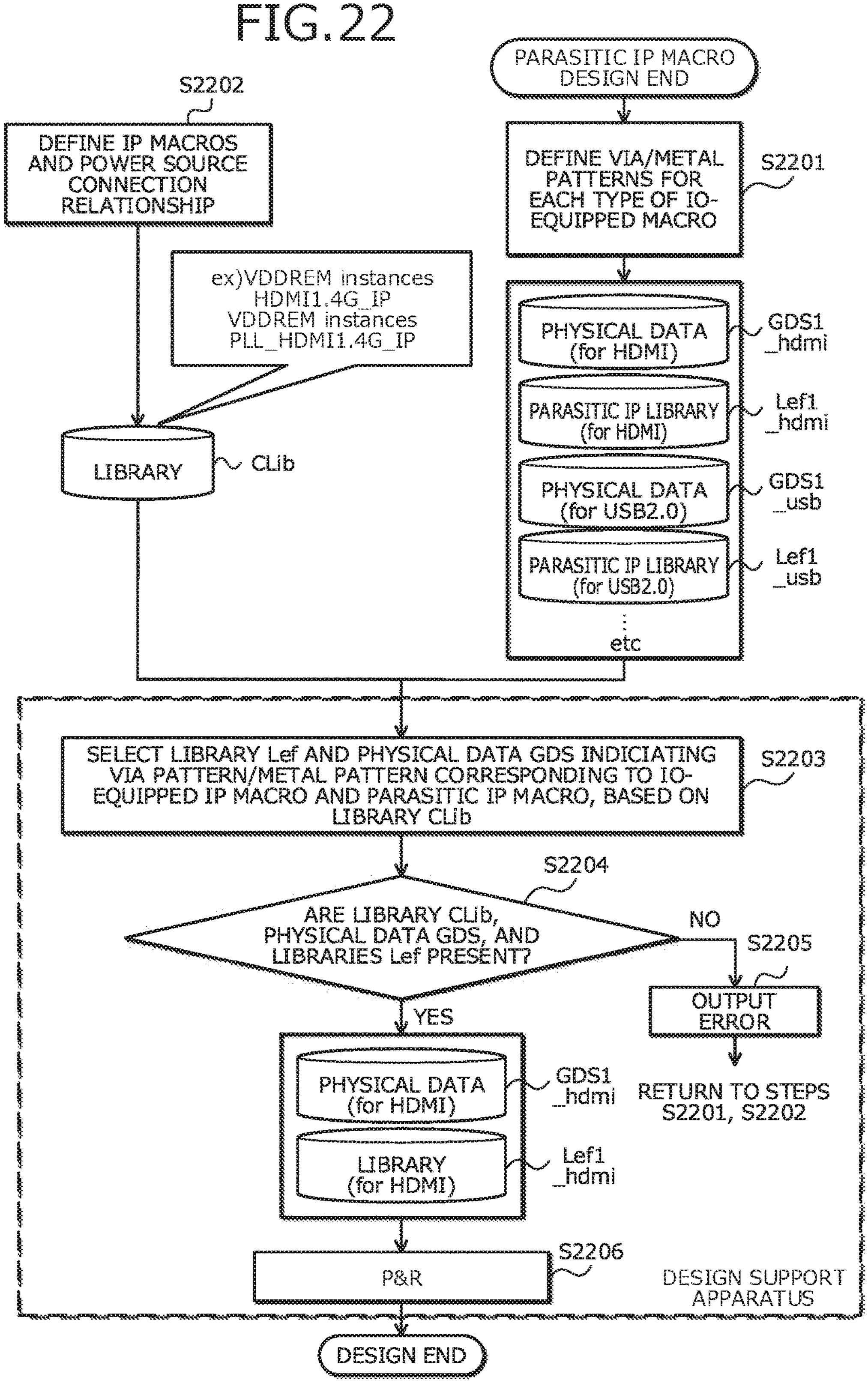
FIG. 22 is a flowchart (part 3) of a design support process procedure example.

FIG. 22 is a flowchart (part 3) of a design support process procedure example. In this example, the designer performs an operation of adding and changing the storage contents in the storage unit 103 through the input device. FIG. 22 depicts an example in which the parasitic IP macro 101 is connected to HDMI. The designer defines via/metal patterns for each type of the IO-equipped macro (step S2201). An example of defining via/metal patterns is the example depicted in FIG. 18. The designer then defines the IP macros and the power source connection relationship (step S2202).

Based on the library Clib, the design support apparatus 100 selects the physical data GDS of the parasitic IP macro 101 and the physical data and the library that indicates the via pattern/metal pattern corresponding to the IO-equipped IP macro 102 (step S2203). The selected library in this case is a parasitic IP library Lef1_hdmi for HDMI, and the selected physical data is the physical data GDS1_hdmi. The design support apparatus 100 determines whether the library CLib, the physical data GDS, and the libraries Lef are present (step S2204).

If it is determined that the library Clib, the physical data GDS, and the libraries Lef are not present (step S2204: NO), the design support apparatus 100 outputs an error (step S2205) and returns to steps S2201, S2202. If it is determined that the library CLib, the physical data GDS, and the libraries Lef are present (step S2204: YES), the design support apparatus 100 performs P&R (step S2206) and terminates a series of the processes of the layout design.

The layout data depicted in FIGS. 1, 3A, 3B, 3C, 7, and 13A to 19 are used in manufacturing to obtain the semiconductor integrated circuit.

As described above, the design support apparatus 100 performs design such that the power source terminals of the parasitic IP macro are connected to the power-supplying terminals of the IO-equipped IP macro according to a result of comparison of the first consumption current value of the parasitic IP macro and the surplus current value of the IO-equipped IP macro. As a result, a power source can be supplied from the IO-equipped IP macro to the parasitic IP macro. Therefore, the number of IO circuits of the parasitic IP macro can be reduced.

In the process of comparison, when determining that the surplus current value is greater than the first consumption current value by a predetermined value or more, the design support apparatus 100 controls the layout apparatus to generate the circuit information. Therefore, only when it is determined that both the IO-equipped IP macro and the parasitic IP macro can operate when the power source is supplied from the IO-equipped. IP macro to the parasitic IP macro, the power source can be supplied from the IO-equipped IP macro to the parasitic IP macro. As a result, the number of IO circuits of the parasitic IP macro can be reduced while guarantee of operation is verified.

When determining that the surplus current value is not greater than the first consumption current value by a predetermined value or more, the design support apparatus 100 outputs error information without providing the control of generating the circuit information. As a result, the designer can easily determine that both the IO-equipped IP macro and the parasitic IP macro cannot operate when the macros are connected. Therefore, the design can be facilitated.

In the process of providing the control of generating the circuit information, the design support apparatus 100 provides control of generating circuit information based on first partial circuit information indicating the parasitic IP macro and second partial circuit information indicating the IO-equipped IP macro.

The IO-equipped IP macro has an IO circuit corresponding to a power source terminal of the IO-equipped IP macro and the parasitic IP macro does not have an IO circuit corresponding to a power source terminal of the parasitic IP macro. Therefore, the number of the IO circuits of the parasitic IP macro can be reduced.

A power source filter corresponding to the IO-equipped IP macro is disposed on the power source terminal of the parasitic IP macro. As a result, the noise of the power source supplied to the parasitic IP macro can be suppressed.

The parasitic IP macro indicated by the first partial circuit information has a power source filter for each of the power source terminals of the parasitic IP macro, and the design support apparatus generates the circuit information in which the enabled and disabled power source filters are determined according to the type of the IO-equipped IP macro. As a result, the noise of the power source supplied to the parasitic IP macro can be suppressed.

The design support apparatus 100 generates a layout based on wiring information that indicates wiring that enables the power source filters corresponding to the type of the IO-equipped IP macro and that connects the power-supplying terminals of the IO-equipped IP macro and the power source terminals of the parasitic IP macro. In this way, the power source filters that are to be enabled are defined in a library depending on the type of the IO-equipped IP macro. As a result, the power source filters can be implemented according to the type of the IO-equipped IP macro without changing the number of the equipped power source filters, and the layout design can be facilitated.

The parasitic IP macro indicated by the first partial circuit information has an analog switch capable of switching a power source filter between enabled and disabled for each of the power source filters disposed on the parasitic IP macro. As a result, the power source filters can be implemented according to the type of the IO-equipped IP macro without changing the number of the equipped power source filters. Therefore, the layout design can be facilitated.

The IO-equipped IP macro indicated by the second partial circuit information has power source wiring capable of controlling the analog switches such that the power source filters corresponding to the type of the IO-equipped IP macro can be enabled among the power source filters disposed on the parasitic IP macro. By preliminarily creating a library such that the control can be provided according to the power source wiring, the analog switches can be switched by simply giving the wiring information that indicates the power source wiring corresponding to the type of the IO-equipped IP macro. As a result, the power source filters can be implemented according to the type of the IO-equipped IP macro without changing the number of the equipped power source filters. Therefore, the layout design can be facilitated.

In the storage unit, via information is preliminarily stored that indicates vias capable of controlling the analog switches enabling the power source filters corresponding to the type of the IO-equipped IP macro, among the power source filters disposed on the parasitic IP macro. The design support apparatus 100 further generates a layout based on the via information. As a result, the power source filters can be implemented according to the type of the IO-equipped IP macro without changing the number of the equipped power source filters. Therefore, the layout design can be facilitated.

As described above, in the semiconductor integrated circuit according to this embodiment, the power source terminals of the first partial circuit are connected to the power-supplying terminals of the second partial circuit. The semiconductor integrated circuit has the power source filters corresponding to the respective power source terminals of the first partial circuit and the analog switches capable of switching the respective power source filters between enabled and disabled. By setting the analog switches such that the power source filters are enabled according to the type of the second partial circuit among the multiple power source filters, the number of the IO circuits of power sources can be reduced and a power source noise amount can be suppressed.

The method of supporting design described in the present embodiment may be implemented by executing a prepared program on a computer such as a personal computer and a workstation. The design support program is stored on a non-transitory, computer-readable recording medium such as a magnetic disk, an optical disk, a USB flash memory, etc., read out from the computer-readable medium, and executed by the computer. The design support program may be distributed through a network such as the Internet.

According to an aspect of the present invention, the number of input/output circuits for a power source can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of supporting design for a circuit comprising a first partial circuit and a second partial circuit, the method being conducted by a computer having a storage device storing a first information and a second information, wherein the first information indicates a first consumption current value during operation of the first partial circuit, the second information indicates a surplus current value based on a second consumption current value during operation of the second partial circuit and an allowable current value of a power source terminal of the second partial circuit, and the power source terminal of the second partial circuit is supplied by a same power source as the first partial circuit, the method comprising:

comparing, by the computer, the first consumption current value and the surplus current value; and controlling, by the computer and according to a result of comparing the first consumption current value and the surplus current value, a layout apparatus to generate circuit information for the circuit, where a power-supplying terminal of the second partial circuit is connected to a power source terminal of the first partial circuit, the power-supplying terminal of the second partial circuit being a terminal capable of supplying to another circuit, power supplied to the power source terminal of the second partial circuit, the power source terminal of the first partial circuit being a terminal to which the power is supplied.

2. The method according to claim 1, wherein the comparing the first consumption current value and the surplus current value, includes determining whether the surplus current value is greater than the first consumption current value by at least a predetermined value, and the controlling includes controlling the layout apparatus to generate the circuit information when the surplus current value is determined to be greater than the first consumption current value by at least the predetermined value.

3. The method according to claim 2 and further comprising aborting the controlling and outputting, by the computer, information that indicates inability to connect the power-supplying terminal of the second partial circuit and the power source terminal of the first partial circuit, when the surplus current value is determined to not be greater than the first consumption current value by at least the predetermined value.

4. The method according to claim 1, wherein the storage device further stores therein first partial circuit information indicating the first partial circuit and second partial circuit information indicating the second partial circuit, and the controlling includes controlling the layout apparatus to generate the circuit information based on the first partial circuit information and the second partial circuit information stored in the storage device.

5. The method according to claim 4, wherein the second partial circuit indicated by the second partial circuit information has an input/output circuit corresponding to the power source terminal of the second partial circuit, and the first partial circuit indicated by the first partial circuit information has no input/output circuit corresponding to the power source terminal of the first partial circuit.

6. The method according to claim 4, wherein a plurality of power source terminals is disposed on the first partial circuit indicated by the first partial circuit information, a plurality of power-supplying terminals corresponding to the plurality of power source terminals of the first partial circuit are disposed on the second partial circuit indicated by the second partial circuit information, and a power source terminal among the plurality of power source terminals of the first partial circuit indicated by the first partial circuit information has a power source filter disposed according to a type of the second partial circuit.

7. The method according to claim 6, wherein the power source filter is disposed for each among the plurality of power source terminals of the first partial circuit, the storage device further stores therein wiring information that indicates wiring that enables a power source filter that among power source filters disposed on the first partial circuit, is selected according to the type of the second partial circuit and that is able to connect the plurality of power source terminals of the first partial circuit and the plurality of power-supplying terminals of the second partial circuit, and the controlling includes controlling the layout terminal to generate the circuit information based on the wiring information stored in the storage device.

8. The method according to claim 6, wherein the power source filter is disposed for each among the plurality of power source terminals of the first partial circuit, the first partial circuit indicted by the first partial circuit information has an analog switch corresponding to each among the plurality of power source filters disposed on the first partial circuit and capable of switching the power source filter between enabled and disabled, and the second partial circuit indicted by the second partial circuit information has wiring enabling control of the analog switch such that among the plurality of power source filters disposed in the first partial circuit, the power source filter selected according to the type of the second partial circuit is enabled.

9. The method according to claim 6, wherein the power source filter is disposed for each among the plurality of power source terminals of the first partial circuit, the first partial circuit indicted by the first partial circuit information has an analog switch corresponding to each among the plurality of power source filters disposed on the first partial circuit and capable of switching the power source filter between enabled and disabled, the storage device further stores therein via information that indicates a via capable of controlling the analog switch so as to enable a power source filter selected according to the type of the second partial circuit from among the plurality of power source filters disposed on the first partial circuit, and the controlling includes controlling the layout apparatus to generate the circuit information based on the via information stored in the storage device.

10. The method of supporting design according to claim 1, wherein the computer has the layout apparatus.

11. A non-transitory, computer-readable recording medium storing therein a design support program for a circuit comprising a first partial circuit and a second partial circuit, the program being conducted by a computer having a storage device storing a first information and a second information, wherein, the first information indicates a first consumption current value during operation of the first partial circuit, the second information indicates a surplus current value based on a second consumption current value during operation of the second partial circuit and an allowable current value of a power source terminal of the second partial circuit, and the power source terminal of the second partial circuit is supplied by a same power source as the first partial circuit, the program causing the computer to execute a process comprising:

comparing the first consumption current value and the surplus current value; and controlling according to a result of comparing the first consumption current value and the surplus current value, a layout apparatus to generate circuit information for the circuit, where a power-supplying terminal of the second partial circuit is connected to a power source terminal of the first partial circuit, the power-supplying terminal of the second partial circuit being a terminal capable of supplying to another circuit, power supplied to the power source terminal of the second partial circuit, the power source terminal of the first partial circuit being a terminal to which the power is supplied.

12. A semiconductor integrated circuit comprising:

a first partial circuit; and a second partial circuit different from the first partial circuit, wherein power-supplying terminals of the second partial circuit are connected to power source terminals of the first partial circuit, the power-supplying terminals of the second partial circuit supplying to another circuit, power supplied to power source terminals of the second partial circuit, the power source terminals of the first partial circuit being terminals to which the power is supplied, and the first partial circuit includes:

a power source filter disposed for each of the power terminals of the first partial circuit, and an analog switch capable of switching the power source filter between enabled and disabled.

13. The semiconductor integrated circuit according to claim 12, wherein the analog switch has a control terminal receiving a control signal for controlling switching of the power source filter between enabled and disabled, the second partial circuit has wiring that generates the control signal, and the first partial circuit has connection wiring connecting the wiring and the control terminal.

14. The semiconductor integrated circuit according to claim 12, wherein the analog switch has a control terminal receiving a control signal for controlling switching of the power source filter between enabled and disabled, and the first partial circuit has wiring that generates the control signal and connection wiring connecting the wiring and the control terminal.

* * * * *